(12) United States Patent
Li et al.

(10) Patent No.: US 8,694,042 B2
(45) Date of Patent: Apr. 8, 2014

(54) METHOD AND APPARATUS FOR DETERMINING A BASE STATION'S TRANSMISSION POWER BUDGET

(75) Inventors: Junyi Li, Bedminster, NJ (US); Xinzhou Wu, Monmouth Junction, NJ (US); Arnab Das, Summit, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1461 days.

(21) Appl. No.: 11/549,611

(22) Filed: Oct. 13, 2006

(65) Prior Publication Data

US 2007/0253385 A1  Nov. 1, 2007

Related U.S. Application Data

(63) Continuation-in-part of application No. 11/487,017, filed on Jul. 14, 2006, and a continuation-in-part of application No. 11/486,714, filed on Jul. 14, 2006, and a continuation-in-part of application No. 11/302,729, filed on Dec. 14, 2005, and a continuation-in-part of application No. 11/251,069, filed on Oct. 14, 2005.

(51) Int. Cl.
*H04W 52/36* (2009.01)
*H04W 52/18* (2009.01)
*H04W 88/08* (2009.01)

(52) U.S. Cl.
USPC .............................. 455/522; 455/69; 455/561

(58) Field of Classification Search
None
See application file for complete search history.

(56) References Cited

U.S. PATENT DOCUMENTS

| | | | |
|---|---|---|---|
| 4,631,720 A | 12/1986 | Koeck | |
| 4,660,196 A | 4/1987 | Gray et al. | |
| 4,679,244 A | 7/1987 | Kawasaki et al. | |
| 4,833,701 A | 5/1989 | Comroe et al. | |
| 5,128,938 A | 7/1992 | Borras | |
| 5,203,013 A | 4/1993 | Breeden et al. | |
| 5,387,905 A | 2/1995 | Grube et al. | |

(Continued)

FOREIGN PATENT DOCUMENTS

| | | |
|---|---|---|
| CN | 1159262 A | 9/1997 |
| CN | 1265792 | 9/2000 |

(Continued)

OTHER PUBLICATIONS

Gunnarson, F.et al.: "Uplink Admission Control in WCDMA Based on Relative Load Estimates", IEEE International Conference on Communications, vol. 1, pp. 3091-3095, IEEE, New York, NY USA (Apr. 28, 2002).

(Continued)

*Primary Examiner* — Philip Sobutka
(74) *Attorney, Agent, or Firm* — John J. Ketchum

(57) ABSTRACT

A base station receives loading information indicative of the loading of other base stations and determines a downlink transmission power budget as a function of the received loading factor information. The base station may decrease/increase a current power budget dedicated to downlink traffic channel segments in response to detecting an increase/decrease in loading at an adjacent base station. Thus, base stations operate in a cooperative manner reducing power output, in at least some cases, where loading at a neighboring base station increases thereby reducing the interference to the base station with the increased load. A base station can consider possible alternative transmission power levels, estimated levels of interference, and/or possible alternative data rates in making trade-off decisions regarding downlink power budget.

35 Claims, 11 Drawing Sheets

(56) References Cited

U.S. PATENT DOCUMENTS

| | | | |
|---|---|---|---|
| 5,434,848 A | 7/1995 | Chimento, Jr. et al. |
| 5,461,645 A | 10/1995 | Ishii |
| 5,465,389 A | 11/1995 | Agrawal et al. |
| 5,506,865 A | 4/1996 | Weaver, Jr. |
| 5,537,414 A | 7/1996 | Takiyasu et al. |
| 5,579,307 A | 11/1996 | Richetta et al. |
| 5,732,328 A | 3/1998 | Mitra et al. |
| 5,835,847 A | 11/1998 | Gilmore et al. |
| 5,867,478 A | 2/1999 | Baum et al. |
| 5,898,925 A | 4/1999 | Honkasalo et al. |
| 5,914,950 A | 6/1999 | Tiedemann, Jr. et al. |
| 5,915,221 A | 6/1999 | Sawyer et al. |
| 5,923,650 A | 7/1999 | Chen et al. |
| 5,933,421 A | 8/1999 | Alamouti et al. |
| 5,940,771 A | 8/1999 | Gollnick et al. |
| 5,966,657 A | 10/1999 | Sporre |
| 5,966,662 A | 10/1999 | Murto |
| 5,978,657 A | 11/1999 | Suzuki |
| 5,999,534 A | 12/1999 | Kim |
| 6,002,676 A | 12/1999 | Fleming |
| 6,004,276 A | 12/1999 | Wright et al. |
| 6,026,081 A | 2/2000 | Hamabe |
| 6,028,842 A | 2/2000 | Chapman et al. |
| 6,028,843 A | 2/2000 | Delp et al. |
| 6,035,000 A | 3/2000 | Bingham |
| 6,069,871 A | 5/2000 | Sharma et al. |
| 6,070,072 A | 5/2000 | Dorenbosch et al. |
| 6,073,025 A | 6/2000 | Chheda et al. |
| 6,075,025 A | 6/2000 | Bishop et al. |
| 6,122,270 A | 9/2000 | Whinnett et al. |
| 6,128,506 A | 10/2000 | Knutsson et al. |
| 6,131,016 A | 10/2000 | Greenstein et al. |
| 6,141,565 A | 10/2000 | Feuerstein et al. |
| 6,169,896 B1 | 1/2001 | Sant et al. |
| 6,173,005 B1 | 1/2001 | Kotzin et al. |
| 6,181,948 B1 | 1/2001 | Kondo |
| 6,201,793 B1 | 3/2001 | Chen et al. |
| 6,205,129 B1 | 3/2001 | Esteves et al. |
| 6,215,791 B1 | 4/2001 | Kim |
| 6,236,646 B1 | 5/2001 | Beming et al. |
| 6,256,478 B1 | 7/2001 | Allen et al. |
| 6,259,927 B1 | 7/2001 | Butovitsch et al. |
| 6,263,392 B1 | 7/2001 | McCauley et al. |
| 6,298,233 B1 | 10/2001 | Souissi et al. |
| 6,308,080 B1 | 10/2001 | Burt et al. |
| 6,310,857 B1 | 10/2001 | Duffield et al. |
| 6,311,065 B1 | 10/2001 | Ushiki et al. |
| 6,374,085 B1 | 4/2002 | Saints et al. |
| 6,377,583 B1 | 4/2002 | Lyles et al. |
| 6,377,955 B1 | 4/2002 | Hartmann et al. |
| 6,405,047 B1 | 6/2002 | Moon et al. |
| 6,414,946 B1 | 7/2002 | Satou et al. |
| 6,445,917 B1 | 9/2002 | Bark et al. |
| 6,453,151 B1 | 9/2002 | Kiang et al. |
| 6,493,539 B1 | 12/2002 | Falco et al. |
| 6,526,281 B1 | 2/2003 | Gorsuch et al. |
| 6,538,986 B2 | 3/2003 | Isaksson et al. |
| 6,545,999 B1 | 4/2003 | Sugita et al. |
| 6,549,780 B2 | 4/2003 | Schiff et al. |
| 6,553,336 B1 | 4/2003 | Johnson et al. |
| 6,590,890 B1 | 7/2003 | Stolyar et al. |
| 6,597,914 B1 | 7/2003 | Silventoinen et al. |
| 6,600,903 B1 | 7/2003 | Lilja et al. |
| 6,609,007 B1 * | 8/2003 | Eibling et al. ............... 455/522 |
| 6,621,808 B1 | 9/2003 | Sadri |
| 6,625,133 B1 | 9/2003 | Balachandran et al. |
| 6,662,024 B2 | 12/2003 | Walton et al. |
| 6,671,512 B2 | 12/2003 | Laakso et al. |
| 6,680,909 B1 | 1/2004 | Bansal et al. |
| 6,697,417 B2 | 2/2004 | Fernandez-Corbaton et al. |
| 6,710,651 B2 | 3/2004 | Forrester et al. |
| 6,728,551 B2 | 4/2004 | Chang |
| 6,742,020 B1 | 5/2004 | Dimitroff et al. |
| 6,745,003 B1 | 6/2004 | Maca et al. |
| 6,751,187 B2 | 6/2004 | Walton et al. |
| 6,771,934 B2 | 8/2004 | Demers et al. |
| 6,788,963 B2 | 9/2004 | Laroia et al. |
| 6,798,761 B2 | 9/2004 | Cain et al. |
| 6,804,289 B2 | 10/2004 | Takahashi |
| 6,804,521 B2 | 10/2004 | Tong et al. |
| 6,816,476 B2 | 11/2004 | Kim et al. |
| 6,836,673 B1 | 12/2004 | Trott et al. |
| 6,865,168 B1 | 3/2005 | Sekine et al. |
| 6,889,056 B2 | 5/2005 | Shibutani et al. |
| 6,892,071 B2 | 5/2005 | Park et al. |
| 6,895,005 B1 | 5/2005 | Malin et al. |
| 6,895,364 B2 | 5/2005 | Banfer |
| 6,901,268 B2 | 5/2005 | Chang |
| 6,901,270 B1 | 5/2005 | Beach |
| 6,904,016 B2 | 6/2005 | Kuo et al. |
| 6,912,405 B2 | 6/2005 | Hiramatsu et al. |
| 6,917,607 B1 | 7/2005 | Yeom et al. |
| 6,940,827 B2 | 9/2005 | Li et al. |
| 6,954,643 B2 | 10/2005 | Petrus |
| 6,957,072 B2 | 10/2005 | Kangras et al. |
| 6,967,937 B1 | 11/2005 | Gormley |
| 6,968,156 B2 | 11/2005 | Sugaya et al. |
| 7,006,841 B2 | 2/2006 | Monogioudis et al. |
| 7,024,460 B2 | 4/2006 | Koopmas et al. |
| 7,027,782 B2 | 4/2006 | Moon et al. |
| 7,031,983 B2 | 4/2006 | Israni et al. |
| 7,034,254 B2 | 4/2006 | Grabowski et al. |
| 7,039,029 B2 | 5/2006 | Lee et al. |
| 7,043,254 B2 | 5/2006 | Chawla et al. |
| 7,047,009 B2 | 5/2006 | Laroia et al. |
| 7,054,643 B2 | 5/2006 | Trossen et al. |
| 7,061,885 B2 | 6/2006 | Kurtz et al. |
| 7,092,672 B1 | 8/2006 | Pekonen et al. |
| 7,120,123 B1 | 10/2006 | Quigley et al. |
| 7,120,448 B2 * | 10/2006 | Brouwer ....................... 455/453 |
| 7,123,910 B2 | 10/2006 | Lucidarme et al. |
| 7,139,536 B2 | 11/2006 | Chiu et al. |
| 7,142,548 B2 | 11/2006 | Fong et al. |
| 7,146,172 B2 | 12/2006 | Li et al. |
| 7,158,796 B2 | 1/2007 | Tiedemann, Jr. et al. |
| 7,161,909 B2 | 1/2007 | Sharma |
| 7,162,203 B1 | 1/2007 | Brunner |
| 7,164,883 B2 | 1/2007 | Rappaport et al. |
| 7,197,025 B2 | 3/2007 | Chuah et al. |
| 7,203,493 B2 | 4/2007 | Fujii et al. |
| 7,218,948 B2 | 5/2007 | Laroia et al. |
| 7,245,935 B2 | 7/2007 | Lin et al. |
| 7,260,054 B2 | 8/2007 | Olszewski |
| 7,269,406 B2 | 9/2007 | Qi et al. |
| 7,277,709 B2 | 10/2007 | Vadgama |
| 7,277,737 B1 | 10/2007 | Vollmer et al. |
| 7,280,814 B2 | 10/2007 | Austin et al. |
| 7,283,559 B2 | 10/2007 | Cho et al. |
| 7,283,836 B2 | 10/2007 | Hwang et al. |
| 7,299,277 B1 | 11/2007 | Moran et al. |
| 7,317,921 B2 | 1/2008 | Mueckenheim et al. |
| 7,319,680 B2 | 1/2008 | Cho et al. |
| 7,321,563 B2 | 1/2008 | Kim et al. |
| 7,340,267 B2 | 3/2008 | Budka et al. |
| 7,349,667 B2 | 3/2008 | Magee et al. |
| 7,356,635 B2 | 4/2008 | Woodings et al. |
| 7,362,702 B2 | 4/2008 | Terrell et al. |
| 7,382,755 B2 | 6/2008 | Dugad et al. |
| 7,395,058 B1 | 7/2008 | Kalofonos et al. |
| 7,397,803 B2 | 7/2008 | Love et al. |
| 7,400,901 B2 | 7/2008 | Kostic et al. |
| 7,412,265 B2 | 8/2008 | Chen et al. |
| 7,418,260 B2 | 8/2008 | Lucidarme et al. |
| 7,430,206 B2 | 9/2008 | Terry et al. |
| 7,430,207 B2 | 9/2008 | Wu et al. |
| 7,430,420 B2 | 9/2008 | Derakhshan et al. |
| 7,447,148 B2 | 11/2008 | Gao et al. |
| 7,463,577 B2 | 12/2008 | Sudo et al. |
| 7,486,620 B2 | 2/2009 | Seol et al. |
| 7,486,638 B2 | 2/2009 | Ofuji et al. |
| 7,502,614 B2 | 3/2009 | Uchida et al. |
| 7,508,792 B2 | 3/2009 | Petrovic et al. |
| 7,510,828 B2 | 3/2009 | Lynn et al. |
| 7,512,076 B2 | 3/2009 | Kwon et al. |

(56) References Cited

U.S. PATENT DOCUMENTS

| | | |
|---|---|---|
| 7,512,185 B2 | 3/2009 | Sharon et al. |
| 7,519,013 B2 | 4/2009 | Destino et al. |
| 7,519,033 B2 | 4/2009 | Soomro et al. |
| 7,522,544 B2 | 4/2009 | Cheng et al. |
| 7,525,971 B2 | 4/2009 | Carroll et al. |
| 7,526,091 B2 | 4/2009 | Jeong et al. |
| 7,539,475 B2 | 5/2009 | Laroia et al. |
| 7,558,235 B2 | 7/2009 | Lester et al. |
| 7,558,572 B2 | 7/2009 | Anigstein |
| 7,561,893 B2 | 7/2009 | Moulsley et al. |
| 7,668,573 B2 | 2/2010 | Laroia et al. |
| 7,743,284 B1 | 6/2010 | Taylor et al. |
| 8,503,938 B2 | 8/2013 | Laroia et al. |
| 2001/0036181 A1 | 11/2001 | Rogers |
| 2001/0046878 A1 | 11/2001 | Chang et al. |
| 2002/0031105 A1* | 3/2002 | Zeira et al. ................. 455/522 X |
| 2002/0037729 A1 | 3/2002 | Kitazawa et al. |
| 2002/0045448 A1 | 4/2002 | Park et al. |
| 2002/0049040 A1 | 4/2002 | Sugaya et al. |
| 2002/0075835 A1 | 6/2002 | Krishnakumar et al. |
| 2002/0077140 A1 | 6/2002 | Monogioudis et al. |
| 2002/0080967 A1 | 6/2002 | Abdo et al. |
| 2002/0082011 A1 | 6/2002 | Fujii et al. |
| 2002/0085516 A1 | 7/2002 | Bridgelall |
| 2002/0093953 A1 | 7/2002 | Naim et al. |
| 2002/0107028 A1 | 8/2002 | Rantalainen et al. |
| 2002/0122431 A1 | 9/2002 | Cho et al. |
| 2002/0136195 A1 | 9/2002 | Kurtz et al. |
| 2002/0142788 A1 | 10/2002 | Chawla et al. |
| 2002/0143858 A1 | 10/2002 | Teague et al. |
| 2002/0147017 A1 | 10/2002 | Li et al. |
| 2002/0177452 A1 | 11/2002 | Ruutu et al. |
| 2002/0186678 A1 | 12/2002 | Averbuch et al. |
| 2003/0003921 A1* | 1/2003 | Laakso ........................ 455/453 |
| 2003/0007498 A1 | 1/2003 | Angle et al. |
| 2003/0012212 A1 | 1/2003 | Earnshaw et al. |
| 2003/0027587 A1 | 2/2003 | Proctor et al. |
| 2003/0028606 A1 | 2/2003 | Koopmans et al. |
| 2003/0064737 A1 | 4/2003 | Eriksson et al. |
| 2003/0078067 A1 | 4/2003 | Kim et al. |
| 2003/0095519 A1 | 5/2003 | Kuo et al. |
| 2003/0114180 A1 | 6/2003 | Black et al. |
| 2003/0123396 A1 | 7/2003 | Seo et al. |
| 2003/0123410 A1 | 7/2003 | Youm |
| 2003/0139197 A1 | 7/2003 | Kostic et al. |
| 2003/0144042 A1 | 7/2003 | Weinfield et al. |
| 2003/0157899 A1 | 8/2003 | Trossen et al. |
| 2003/0169705 A1 | 9/2003 | Knisely et al. |
| 2003/0185224 A1 | 10/2003 | Ramanan et al. |
| 2003/0185285 A1 | 10/2003 | Talwar |
| 2003/0193915 A1 | 10/2003 | Lee et al. |
| 2003/0198204 A1 | 10/2003 | Taneja et al. |
| 2003/0198206 A1 | 10/2003 | Cain et al. |
| 2003/0206541 A1 | 11/2003 | Yun et al. |
| 2003/0207691 A1 | 11/2003 | Chen |
| 2003/0207693 A1 | 11/2003 | Roderique |
| 2003/0214906 A1 | 11/2003 | Hu et al. |
| 2003/0214928 A1 | 11/2003 | Chuah et al. |
| 2003/0223354 A1 | 12/2003 | Olszewski et al. |
| 2004/0001429 A1 | 1/2004 | Ma et al. |
| 2004/0004954 A1 | 1/2004 | Terry et al. |
| 2004/0013103 A1 | 1/2004 | Zhang et al. |
| 2004/0057402 A1 | 3/2004 | Ramos et al. |
| 2004/0062206 A1 | 4/2004 | Soong et al. |
| 2004/0081089 A1 | 4/2004 | Ayyagari et al. |
| 2004/0082344 A1 | 4/2004 | Moilanen et al. |
| 2004/0085936 A1 | 5/2004 | Gopalakrishnan et al. |
| 2004/0091026 A1 | 5/2004 | Nakayama |
| 2004/0111640 A1 | 6/2004 | Baum |
| 2004/0120411 A1 | 6/2004 | Walton et al. |
| 2004/0125776 A1 | 7/2004 | Haugli et al. |
| 2004/0127226 A1 | 7/2004 | Dugad et al. |
| 2004/0141466 A1 | 7/2004 | Kim et al. |
| 2004/0147262 A1 | 7/2004 | Lescuyer et al. |
| 2004/0147276 A1 | 7/2004 | Gholmieh et al. |
| 2004/0160922 A1 | 8/2004 | Nanda et al. |
| 2004/0166869 A1 | 8/2004 | Laroia et al. |
| 2004/0166886 A1 | 8/2004 | Laroia et al. |
| 2004/0166887 A1 | 8/2004 | Laroia et al. |
| 2004/0180658 A1 | 9/2004 | Uchida et al. |
| 2004/0184410 A1 | 9/2004 | Park |
| 2004/0192371 A1 | 9/2004 | Zhao et al. |
| 2004/0196802 A1 | 10/2004 | Bae et al. |
| 2004/0203717 A1 | 10/2004 | Wingrowicz et al. |
| 2004/0203981 A1 | 10/2004 | Budka et al. |
| 2004/0218617 A1 | 11/2004 | Sagfors |
| 2004/0223455 A1 | 11/2004 | Fong et al. |
| 2004/0224677 A1 | 11/2004 | Kuchibhotla et al. |
| 2004/0228313 A1 | 11/2004 | Cheng et al. |
| 2004/0233838 A1 | 11/2004 | Sudo et al. |
| 2004/0235510 A1 | 11/2004 | Elicegui et al. |
| 2004/0248518 A1 | 12/2004 | Kashiwase |
| 2004/0248568 A1 | 12/2004 | Lucidarme et al. |
| 2004/0252662 A1 | 12/2004 | Cho et al. |
| 2004/0253996 A1 | 12/2004 | Chen et al. |
| 2004/0258040 A1 | 12/2004 | Joshi et al. |
| 2004/0259546 A1 | 12/2004 | Balachandran et al. |
| 2004/0264414 A1 | 12/2004 | Dorenbosch |
| 2004/0266474 A1 | 12/2004 | Petrus et al. |
| 2005/0003847 A1 | 1/2005 | Love et al. |
| 2005/0008892 A1 | 1/2005 | Yamamoto et al. |
| 2005/0037775 A1 | 2/2005 | Moeglein et al. |
| 2005/0047344 A1 | 3/2005 | Seol et al. |
| 2005/0047393 A1 | 3/2005 | Liu et al. |
| 2005/0047416 A1 | 3/2005 | Heo et al. |
| 2005/0053099 A1 | 3/2005 | Spear et al. |
| 2005/0058637 A1 | 3/2005 | Lynn et al. |
| 2005/0068922 A1 | 3/2005 | Jalali et al. |
| 2005/0099987 A1 | 5/2005 | Lester et al. |
| 2005/0111361 A1 | 5/2005 | Hosein et al. |
| 2005/0122900 A1 | 6/2005 | Tuulos et al. |
| 2005/0124345 A1 | 6/2005 | Laroia et al. |
| 2005/0128999 A1 | 6/2005 | Kwon et al. |
| 2005/0135320 A1 | 6/2005 | Tiedemann et al. |
| 2005/0136937 A1 | 6/2005 | Qian et al. |
| 2005/0143084 A1 | 6/2005 | Cheng et al. |
| 2005/0143114 A1 | 6/2005 | Moulsley et al. |
| 2005/0152320 A1 | 7/2005 | Marinier et al. |
| 2005/0157803 A1 | 7/2005 | Kim et al. |
| 2005/0157876 A1 | 7/2005 | Jeong et al. |
| 2005/0170782 A1 | 8/2005 | Rong et al. |
| 2005/0181732 A1 | 8/2005 | Kang et al. |
| 2005/0185632 A1 | 8/2005 | Draves et al. |
| 2005/0195765 A1 | 9/2005 | Sharon et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0232154 A1 | 10/2005 | Bang et al. |
| 2005/0243938 A1 | 11/2005 | Armstrong et al. |
| 2005/0249118 A1 | 11/2005 | Terry et al. |
| 2005/0250509 A1 | 11/2005 | Choksi et al. |
| 2005/0250529 A1 | 11/2005 | Funnell et al. |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0019694 A1 | 1/2006 | Sutivong et al. |
| 2006/0034174 A1 | 2/2006 | Nishibayashi et al. |
| 2006/0040696 A1 | 2/2006 | Lin et al. |
| 2006/0045013 A1 | 3/2006 | Vannithamby et al. |
| 2006/0056346 A1 | 3/2006 | Vadgama et al. |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0083161 A1 | 4/2006 | Laroia et al. |
| 2006/0089104 A1 | 4/2006 | Kaikkonen et al. |
| 2006/0092881 A1 | 5/2006 | Laroia et al. |
| 2006/0104240 A1 | 5/2006 | Sebire et al. |
| 2006/0126497 A1 | 6/2006 | Na et al. |
| 2006/0128410 A1 | 6/2006 | Derryberry et al. |

(56) References Cited

U.S. PATENT DOCUMENTS

| | | |
|---|---|---|
| 2006/0133346 A1 | 6/2006 | Chheda et al. |
| 2006/0135193 A1 | 6/2006 | Ratasuk et al. |
| 2006/0140154 A1 | 6/2006 | Kwak et al. |
| 2006/0142032 A1 | 6/2006 | Derakhshan et al. |
| 2006/0164981 A1 | 7/2006 | Olsson et al. |
| 2006/0165029 A1 | 7/2006 | Melpignano et al. |
| 2006/0176807 A1 | 8/2006 | Wu et al. |
| 2006/0182022 A1 | 8/2006 | Abedi |
| 2006/0203765 A1 | 9/2006 | Laroia et al. |
| 2006/0205356 A1 | 9/2006 | Laroia et al. |
| 2006/0205396 A1 | 9/2006 | Laroia et al. |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0246916 A1 | 11/2006 | Cheng et al. |
| 2006/0270399 A1 | 11/2006 | Qi et al. |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0002806 A1 | 1/2007 | Soomro et al. |
| 2007/0004437 A1 | 1/2007 | Harada et al. |
| 2007/0015541 A1 | 1/2007 | Dominique et al. |
| 2007/0026803 A1 | 2/2007 | Malm et al. |
| 2007/0026808 A1 | 2/2007 | Love et al. |
| 2007/0030828 A1 | 2/2007 | Vimpari et al. |
| 2007/0036116 A1 | 2/2007 | Eiger et al. |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081492 A1 | 4/2007 | Petrovic et al. |
| 2007/0081498 A1 | 4/2007 | Niwano et al. |
| 2007/0104128 A1 | 5/2007 | Laroia et al. |
| 2007/0104164 A1 | 5/2007 | Laroia et al. |
| 2007/0133412 A1 | 6/2007 | Hutter et al. |
| 2007/0140168 A1 | 6/2007 | Laroia et al. |
| 2007/0140179 A1 | 6/2007 | Zhang et al. |
| 2007/0141994 A1 | 6/2007 | Cheng et al. |
| 2007/0147283 A1 | 6/2007 | Laroia et al. |
| 2007/0147377 A1 | 6/2007 | Laroia et al. |
| 2007/0149126 A1 | 6/2007 | Rangan et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das et al. |
| 2007/0149194 A1 | 6/2007 | Das et al. |
| 2007/0149227 A1 | 6/2007 | Parizhsky et al. |
| 2007/0149228 A1 | 6/2007 | Das et al. |
| 2007/0149238 A1 | 6/2007 | Das et al. |
| 2007/0159969 A1 | 7/2007 | Das et al. |
| 2007/0168326 A1 | 7/2007 | Das et al. |
| 2007/0173208 A1 | 7/2007 | Nishio et al. |
| 2007/0183308 A1 | 8/2007 | Korobkov et al. |
| 2007/0213087 A1 | 9/2007 | Laroia et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253355 A1 | 11/2007 | Hande et al. |
| 2007/0253357 A1 | 11/2007 | Das et al. |
| 2007/0253358 A1 | 11/2007 | Das et al. |
| 2007/0253449 A1 | 11/2007 | Das et al. |
| 2007/0258365 A1 | 11/2007 | Das et al. |
| 2008/0031368 A1 | 2/2008 | Lindoff et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2008/0167047 A1 | 7/2008 | Abedi |
| 2009/0004983 A1 | 1/2009 | Darabi et al. |
| 2009/0034455 A1 | 2/2009 | Lee et al. |
| 2009/0103507 A1 | 4/2009 | Gu et al. |
| 2009/0106507 A1 | 4/2009 | Skerlj et al. |
| 2010/0220626 A1 | 9/2010 | Das et al. |
| 2011/0090812 A1 | 4/2011 | Aoyama |
| 2011/0149789 A1 | 6/2011 | Edge |
| 2013/0230027 A1 | 9/2013 | Das et al. |
| 2013/0242888 A1 | 9/2013 | Das et al. |

FOREIGN PATENT DOCUMENTS

| | | |
|---|---|---|
| CN | 1286832 A | 3/2001 |
| CN | 1316140 | 10/2001 |
| CN | 1335036 A | 2/2002 |
| CN | 1338877 A | 3/2002 |
| CN | 1507708 | 6/2004 |
| CN | 1545252 A | 11/2004 |
| CN | 1604685 | 4/2005 |
| DE | 10162564 A1 | 7/2003 |
| EP | 1037419 A2 | 9/2000 |
| EP | 1037491 A1 | 9/2000 |
| EP | 1054518 A1 | 11/2000 |
| EP | 1089500 A2 | 4/2001 |
| EP | 1179962 | 2/2002 |
| EP | 1180881 A1 | 2/2002 |
| EP | 1180907 A2 | 2/2002 |
| EP | 1221273 A1 | 7/2002 |
| EP | 1233637 | 8/2002 |
| EP | 1377100 A2 | 1/2004 |
| EP | 1511245 A2 | 3/2005 |
| EP | 1564953 A2 | 8/2005 |
| EP | 1571762 A1 | 9/2005 |
| EP | 1594260 A1 | 11/2005 |
| EP | 1758276 A1 | 2/2007 |
| EP | 1841259 A2 | 10/2007 |
| GB | 2340693 | 2/2000 |
| JP | 8008806 | 1/1996 |
| JP | 08008806 | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 11122167 A | 4/1999 |
| JP | 2000049689 A | 2/2000 |
| JP | 2001007761 | 1/2001 |
| JP | 2001016152 | 1/2001 |
| JP | 2001510974 | 8/2001 |
| JP | 2001512921 T | 8/2001 |
| JP | 2001251680 A | 9/2001 |
| JP | 2001523901 T | 11/2001 |
| JP | 2001525135 T | 12/2001 |
| JP | 2002077992 | 3/2002 |
| JP | 2002111627 A | 4/2002 |
| JP | 2002262330 A | 9/2002 |
| JP | 2003018641 A | 1/2003 |
| JP | 2003018641 A | 1/2003 |
| JP | 2003500911 | 1/2003 |
| JP | 2003509983 A | 3/2003 |
| JP | 2003510887 | 3/2003 |
| JP | 2003244161 | 8/2003 |
| JP | 2004153585 | 5/2004 |
| JP | 2004297284 A | 10/2004 |
| JP | 2004533731 | 11/2004 |
| JP | 2004350052 | 12/2004 |
| JP | 2005073276 | 3/2005 |
| JP | 2005073276 A | 3/2005 |
| JP | 2005130482 | 5/2005 |
| JP | 2005136773 A | 5/2005 |
| JP | 2005142965 A | 6/2005 |
| JP | 2005525730 A | 8/2005 |
| JP | 2005526417 A | 9/2005 |
| JP | 2005333671 | 12/2005 |
| JP | 2006514735 A | 5/2006 |
| JP | 2006518578 A | 8/2006 |
| JP | 06268574 A | 10/2006 |
| JP | 2006524966 T | 11/2006 |
| JP | 2006526323 A | 11/2006 |
| JP | 2007509531 A | 4/2007 |
| JP | 2007514364 A | 5/2007 |
| JP | 2007514378 T | 5/2007 |
| JP | 2007514378 T | 5/2007 |

(56) References Cited

FOREIGN PATENT DOCUMENTS

| | | | |
|---|---|---|---|
| JP | 2007521685 A | 8/2007 | |
| JP | 2007522692 A | 8/2007 | |
| JP | 2007525044 A | 8/2007 | |
| JP | 2007525045 | 8/2007 | |
| JP | 2011045054 | 3/2011 | |
| KR | 1019990084525 | 12/1999 | |
| KR | 20010014223 | 2/2001 | |
| KR | 20040018526 | 3/2004 | |
| KR | 20040053859 A | 6/2004 | |
| KR | 20040084599 A | 10/2004 | |
| KR | 20040110044 A | 12/2004 | |
| KR | 20050021083 A | 3/2005 | |
| KR | 20050021083 A | 3/2005 | |
| KR | 20050023187 A | 3/2005 | |
| KR | 20050039376 A | 4/2005 | |
| KR | 20050099633 | 10/2005 | |
| KR | 1020050121274 | 12/2005 | |
| KR | 20060012282 A | 2/2006 | |
| KR | 20060012282 A | 2/2006 | |
| RU | 2149518 | 5/2000 | |
| RU | 2181529 | 4/2002 | |
| RU | 2188506 C2 | 8/2002 | |
| RU | 2202154 C2 | 4/2003 | |
| TW | 200423642 | 11/2004 | |
| TW | 200539627 | 12/2005 | |
| WO | WO-9408432 | 4/1994 | |
| WO | WO9623371 | 8/1996 | |
| WO | 9845967 A2 | 10/1998 | |
| WO | WO9845967 A2 | 10/1998 | |
| WO | 9856120 | 12/1998 | |
| WO | WO9856120 | 12/1998 | |
| WO | 9907090 A1 | 2/1999 | |
| WO | WO-9909779 A1 | 2/1999 | |
| WO | WO9913600 A1 | 3/1999 | |
| WO | WO9959254 A2 | 11/1999 | |
| WO | WO0101610 A1 | 1/2001 | |
| WO | WO-0122759 A1 | 3/2001 | |
| WO | WO0135548 A1 | 5/2001 | |
| WO | 0182504 | 11/2001 | |
| WO | WO 0182504 | 11/2001 | |
| WO | 0233841 | 4/2002 | |
| WO | WO0232183 A1 | 4/2002 | |
| WO | WO0232183 A1 | 4/2002 | |
| WO | WO0239760 A2 | 5/2002 | |
| WO | WO02049305 | 6/2002 | |
| WO | WO02049305 | 6/2002 | |
| WO | WO02073831 A1 | 9/2002 | |
| WO | 02104058 | 12/2002 | |
| WO | WO02101941 A2 | 12/2002 | |
| WO | WO03094544 A1 | 11/2003 | |
| WO | WO03105498 A1 | 12/2003 | |
| WO | 2004077728 A2 | 9/2004 | |
| WO | 2004084503 A2 | 9/2004 | |
| WO | WO2004077685 A2 | 9/2004 | |
| WO | WO2004084452 | 9/2004 | |
| WO | WO2004084503 A2 | 9/2004 | |
| WO | 2004100450 A1 | 11/2004 | |
| WO | WO2004100450 | 11/2004 | |
| WO | 2004110081 A1 | 12/2004 | |
| WO | WO2004105420 A1 | 12/2004 | |
| WO | WO2004110081 A1 | 12/2004 | |
| WO | WO2005034438 | 4/2005 | |
| WO | 2005057812 A1 | 6/2005 | |
| WO | 2005060132 | 6/2005 | |
| WO | 2005060271 | 6/2005 | |
| WO | 2005060277 | 6/2005 | |
| WO | WO2005060132 | 6/2005 | |
| WO | WO2005065056 A2 | 7/2005 | |
| WO | WO2005069519 | 7/2005 | |
| WO | WO2005125049 | 12/2005 | |
| WO | 2006044718 | 4/2006 | |
| WO | WO2006075293 A1 | 7/2006 | |
| WO | 2007031956 A2 | 3/2007 | |
| WO | WO2007031956 A2 | 3/2007 | |

OTHER PUBLICATIONS (060597B6) International Search Report, PCT/US2006/040543—International Search Authority—European Patent Office—Mar. 29, 2007.
(060597B6) International Preliminary Report on Patentability, PCT/US2006/040543—International Search Authority—The International Bureau of WIPO—Geneva, Switzerland—Apr. 16, 2008.
(060597B6) Written Opinion, PCT/US2006/040543—International Search Authority—European Patent Office—Mar. 29, 2007.
Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004), Oct. 18-20, 2004, pp. 654-658.
Majmundar, "Impact of Mobile-Originated Short Message Service on the Digital Control Channel of TDMA Systems," Vehicular Technology Conference, 2000, IEEE VTS Fall VTC 2000. 52nd Sep. 24-28, 2000, Piscataway, NJ, USA, IEEE, Sep. 24, 2000, pp. 1550-1555.
Wada, "Study of an OFDM Cellular System Using a Single Band," 2002 Communication Society Convention, Collection of Lecture Papers 1, Japan, IEEE, Aug. 20, 2002, p. 355, B-5-58.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 184-190, Sep. 2004.
Hang Zhang et al, "Clean up for Closed-Loop MIMO in H-ARQ MAP IE", IEEE P802.16e/D7 Broadband Wireless Access Working Group <http://ieee802.org/16>, pp. 6, Mar. 10, 2010.
Ericsson: Discussion on SIR Measurement, TSG-RAN Working Group 4 (Radio) meeting #18, Berlin, Germany, 3GPP TS 25.101 V3.7.0, Jul. 9, 2001, R4-010895, URL:http://www.3gpp.org/ftp/tsg_ran/WG4_Radio/TSGR4_18/Docs/R4-010895.zip.
European Search Report—EP11159855—Search Authority—Berlin—Apr. 26, 2011.
TIM/TILAB, Blu, Mobilkom Austria, One2one, Telefonica: Re-introduction of SIR measurement, 3GPP TSG-RAN4 Meeting #17,3GPP, May 21, 2001, R4-010647, URL: http://www.3gpp.org/ftp/tsg_ran/WG4_Radio/TSGR4_17/Docs/R4-010647.Zip.
Translation of Office Action in Chinese application 200680047991.2 corresponding to U.S. Appl. No. 11/608,785, citing CN1604685 dated Dec. 31, 2010.
Translation of Office Action in Japan application 2008-535788 corresponding to U.S. Appl. No. 11/549,604, citing WO200560277, WO200534438, US200599987, JP2004350052, JP09307939 and US2005136937 dated Jan. 4, 2011.
Translation of Office Action in Japan application 2008-547460 corresponding to U.S. Appl. No. 11/333,771, citing JP2006514735 and JP2001007761 dated Mar. 15, 2011.
Translation of Office Action in Japan application 2010-275603 corresponding to U.S. Appl. No. 11/251,069, citing 3GPP ETSI TS 125 331; TIM/TILAB_R4-010647; Ericsson R4-010895; and JP2003018641A dated Feb. 8, 2011.
Translation of Office Action in Japanese application 2008-535738 corresponding to U.S. Appl. No. 11/486,714, citing JP2007514378, JP2003510887 and WO9623371 dated Nov. 16, 2010.
Translation of Office Action in Japanese application 2008-535789 corresponding to U.S. Appl. No. 11/549,611, citing JP2003244161, JP200277992 and JP2001016152 dated Jan. 18, 2011.
Translation of Office Action in Ukraine application 200508984 corresponding to U.S. Appl. No. 11/748,433, citing US20020160802, WO0232183, RU2181529, WO9845967, EP1377100, US5867478, US20010007552, US6035000 and US5933421 dated Dec. 9, 2010.
Translation of Office Action in Ukraine Application 201010406 corresponding to U.S. Appl. No. 11/748,433, citing US5867478,

(56) References Cited

OTHER PUBLICATIONS

US20010007552, US6035000, US5933421, WO02073831, WO02032183, RU2181529 and EP1377100 dated Feb. 22, 2011.
3GPP: ETSI TS 125 331 V6.3.0: Radio Resource Control (RRC) protocol specification (3GPP TS 25.331 version 6.3.0 Release 6), ETSI TS 125 331, Sep. 1, 2004, pp. 49, 202-209, 220,221,406,579-585, 589, 930.
TIM/TILAB, Blu, Mobilkom Austria, One2one, Telefonica: Re-introduction of SIR measurement, 3GPP TSG-RAN4 Meeting #17, 3GPP, May 21, 2001, R4-010647, URL: http://www.3gpp.org/ftp/tsg_ran/WG4_Radio/TSGR4_17/Docs/R4-010647.Zip.
Translation of Office Action in Ukraine application 200508984 corresponding to U.S. Appl. No. 11/748,433, citing US20020160802, WO0232183, RU21529, WO9845967, EP1377100, US5867478, US20010007552, US6035000 and US5933421 dated Dec. 9, 2012.
3GPP TSG RAN2#45bis. "EDCH Buffer Status Reporting," R2-050026, Sophia Antipolis, France, Jan. 10-14, 2005, URL: http://www.3gpp.org/ftp/tsg_ran/WG2_RL2/TSGR2_45bis/Dcs/R2-050026.zip.
3GPP TSG-RAN WG2 meeting #48. "Scheduling Information Contents," R2-051957, London, United Kingdom, Aug. 29, 2005, URL: http://3gpp.org/ftp/tsg_ran/WG2_RL2/TSGR2_48/Docments/R2-095517.zip.
Chang, Cheng-Ta: "Downlink Transmit Power Issues in a WCDMA Cellular System," Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.
Gunnarsson, G. et al., "Location Trial System for Mobile Phones," Global Telecommunications Conference, 1998. Globecom 98. The Bridge to Global Integration. IEEE, vol. 4, pp. 2211-2216, Nov. 8-12, 1998.
Hobfeld, T. et al., "Supporting Vertical Handover by Using a Pastry Peer-to-Peer Overlay Network," Fourth Annual IEEE International Conference on Pervasive Computing and Communications Workshops, 2006. Percom Workshops 2006. Mar. 13-17, 2006, pp. 163-167, p. 164, paragraph III, IEEE, Piscataway, NJ, USA, XP010910514, ISBN: 0-7695-2520-2.
LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Documents/R2-050852.zip.
Samsung: "Uplink control signaling structure (Revision of R1-041086)," 3GPP TSG-RAN WG1 Meeting #38bis, Tdoc R1-041222, 3GPP, Sep. 20, 2004, URL: http://www.3gpp.org/ftp/tsg_ran/WG1_RL1/TSGR1_38bis/Dcs/R1-041222.zip.
Taiwan Search Report—TW095137938—TIPO—Jul. 21, 2011.
3GPP: ETSI TS 125 331 V6.3.0: Radio Resource Control (RRC) protocol specification (3GPP TS 25.331 version 6.3.0 Release 6), Sep. 1, 2004, pp. 49, 202-209, 220, 221,406, 579-585, 589, 930.
Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004), Oct. 18-Oct. 20, 2004, pp. 654-658.
Kwon, et al., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.
Majmundar, "Impact of Mobile-Originated Short Message Service on the Digital Control Channel of TDMA Systems," Vehicular Technology Conference, 2000. IEEE VTS Fall VTC 2000. 52nd Sep. 24-28, 2000, Piscataway, NJ, USA, IEEE, Sep. 24, 2000, pp. 1550-1555.
Wada, "A Study of OFDM Cellular System Using Single Band" Proceedings 1 of the 2002 Communications Society Conference, Japan, The Institute of Electronics, Information and Communication Engineers, Aug. 20, 2002, p. 355, B-5-58.

\* cited by examiner

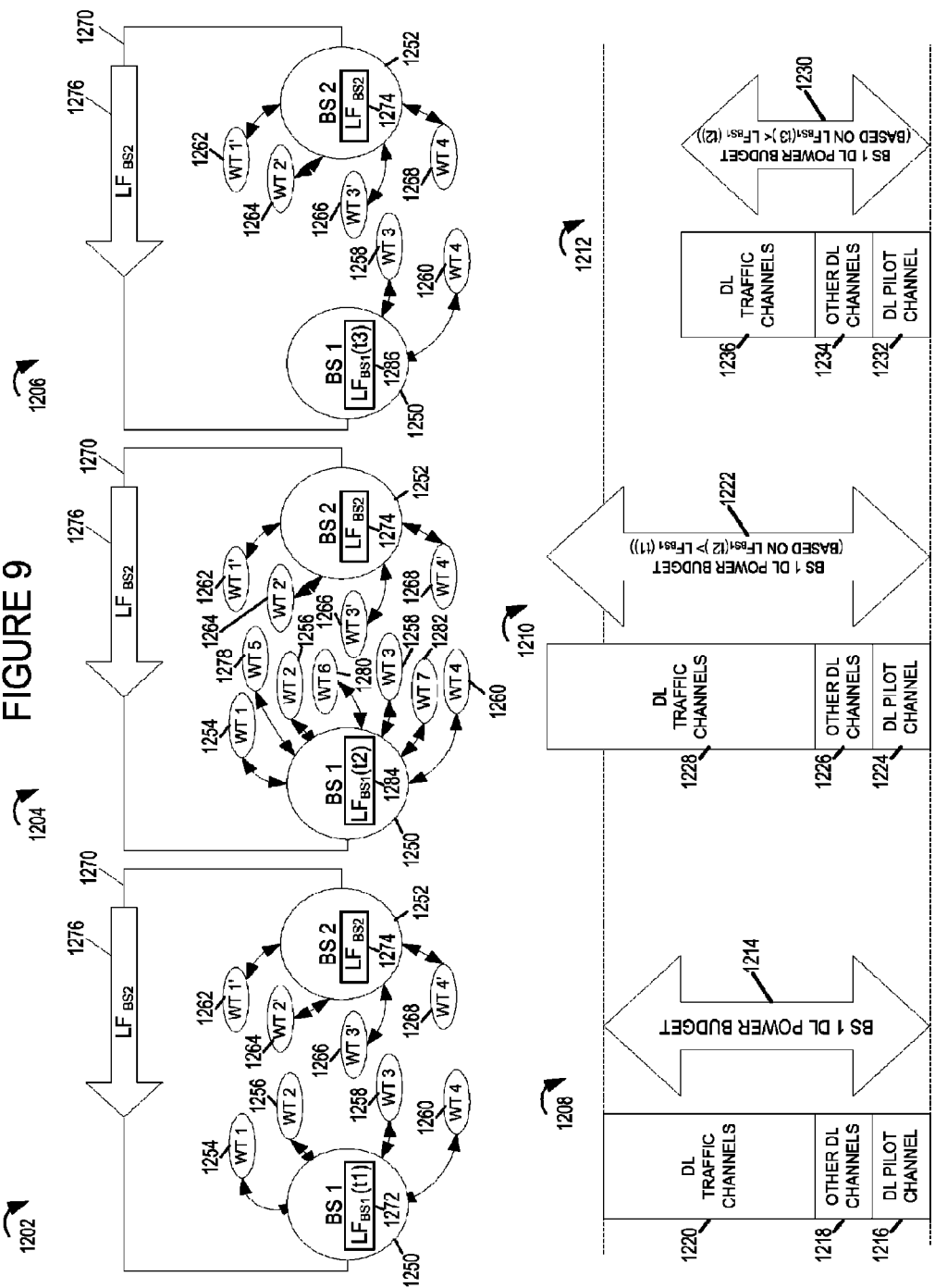

METHOD AND APPARATUS FOR DETERMINING A BASE STATION'S TRANSMISSION POWER BUDGET

RELATED APPLICATIONS

This application is a continuation-in-part of U.S. Ser. No. 11/251,069 filed Oct. 14, 2005, a continuation-in-part of U.S. patent application Ser. No. 11/302,729 filed Dec. 14, 2005, a continuation-in-part of U.S. patent application Ser. No. 11/486,714 filed Jul. 14, 2006 and a continuation-in-part of U.S. application Ser. No. 11/487,017 filed Jul. 14, 2006 each of which is hereby expressly incorporated by reference.

FIELD OF THE INVENTION

The present invention related to wireless communication systems and, more particularly, to power control in wireless communication systems.

BACKGROUND

In a wireless communications system including a plurality of base stations with at least some of the base stations using the same air resources, e.g., frequency spectrum, downlink transmission from one base station can interference with downlink transmissions of other, e.g., adjacent base stations using the same frequency spectrum. Downlink traffic channel loading conditions at a particular base station attachment point typically vary over time as a function of a number of factors including: number of users, types of users, types of applications in use, amounts of data to be communicated, error tolerance levels, latency requirements, channel conditions, error rates, an wireless terminals' locations. Varying the transmission power level of a traffic channel segment can influence achievable information data rates to a particular wireless terminal, but also changes the level of interference from the perspective of other wireless terminals attached to a different base station attachment point of another, e.g., adjacent, base station using the same frequency spectrum.

By using a fixed downlink transmission power budget for each base station attachment point overall downlink interference in the system can be controlled. The power associated with different sub-channels within the downlink traffic channel can be varied with the overall downlink power budget being maintained to a fixed level. This approach tends to limit overall interference in the system, but fails to take advantage of different system loading conditions to optimize throughput.

It would be advantageous if a base station were not restrained to a single downlink power budget but could vary its downlink transmission power budget in response to changing loading conditions at its own or adjacent base stations. It would be beneficial if adjacent base stations exchanged loading information thus allowing a base station to make timely decisions regarding downlink transmission power levels. In addition, it would be beneficial if the power budget determinations for a particular base station were performed at the base station, since the base station has readily available pertinent information such as current loading conditions, current channel conditions, user profiles, detected changes, applications in progress, thus facilitating a rapid informed response to changing conditions.

SUMMARY

Various embodiments are directed to methods and apparatus for communicating, collecting, measuring, reporting and/or using information which can be used for interference control purposes, load management and/or dynamic variation of base station downlink power budget.

In accordance with various embodiments, a base station receives loading information indicative of the loading of other, e.g., adjacent base stations, and the base station determines a downlink transmission power budget as a function of the received loading factor information. For example, a base station may decrease a current power budget dedicated to downlink traffic channel segments in response to detecting an increase in loading at an adjacent base station. The base station may increase a current power budget dedicated to downlink traffic channel segments in response to detecting a decrease in loading at an adjacent base station. Thus, base stations operate in a cooperative manner reducing power output, in at least some cases, where loading at a neighboring base station increases thereby reducing the interference to the base station with the increased load. This is in sharp contrast to systems which might try to increase power output in response to increasing load at a neighboring base station to overcome the increased interference generated by the neighboring base station with the increased communications load. The described methods and apparatus are particularly well suited for use in a communication system including multiple base stations which may interfere with one another. This is because in a wireless communications system including a plurality of base stations, the downlink transmissions from one base station generate interference with respect to other base stations, e.g., adjacent base stations using the same frequency spectrum. A base station can consider possible alternative transmission power levels, estimated levels of interference, and/or possible alternative data rates in making tradeoff decisions regarding downlink power budget, e.g., for downlink traffic channels.

An exemplary method of operating a first base station in accordance with various embodiments includes: receiving second base station loading factor information indicative of loading of a second base station attachment point corresponding to a second base station; and determining a downlink transmission power budget as a function of said received second base station loading factor information. An exemplary base station in accordance with various embodiments comprises: an interface for receiving signals communicating base station loading factor information indicative of loading of at least one base station attachment point corresponding to at least one other base station; a loading factor information recovery module for recovering loading factor information corresponding to at least one other base station from said received signals; and a downlink transmission power budget determination module, wherein said downlink transmission power budget determination module determines a downlink transmission power budget for an attachment point of the base station as a function of said recovered loading factor information corresponding to at least one other base station.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

BRIEF DESCRIPTION OF THE FIGURES

FIG. 9 is a drawing used to illustrate features of various embodiments in which a base station in a wireless communication system including a plurality of base stations receives loading factor information corresponding to another base station and determines a downlink transmission power budget as a function of base station loading factor information.

DETAILED DESCRIPTION

Figure 1:
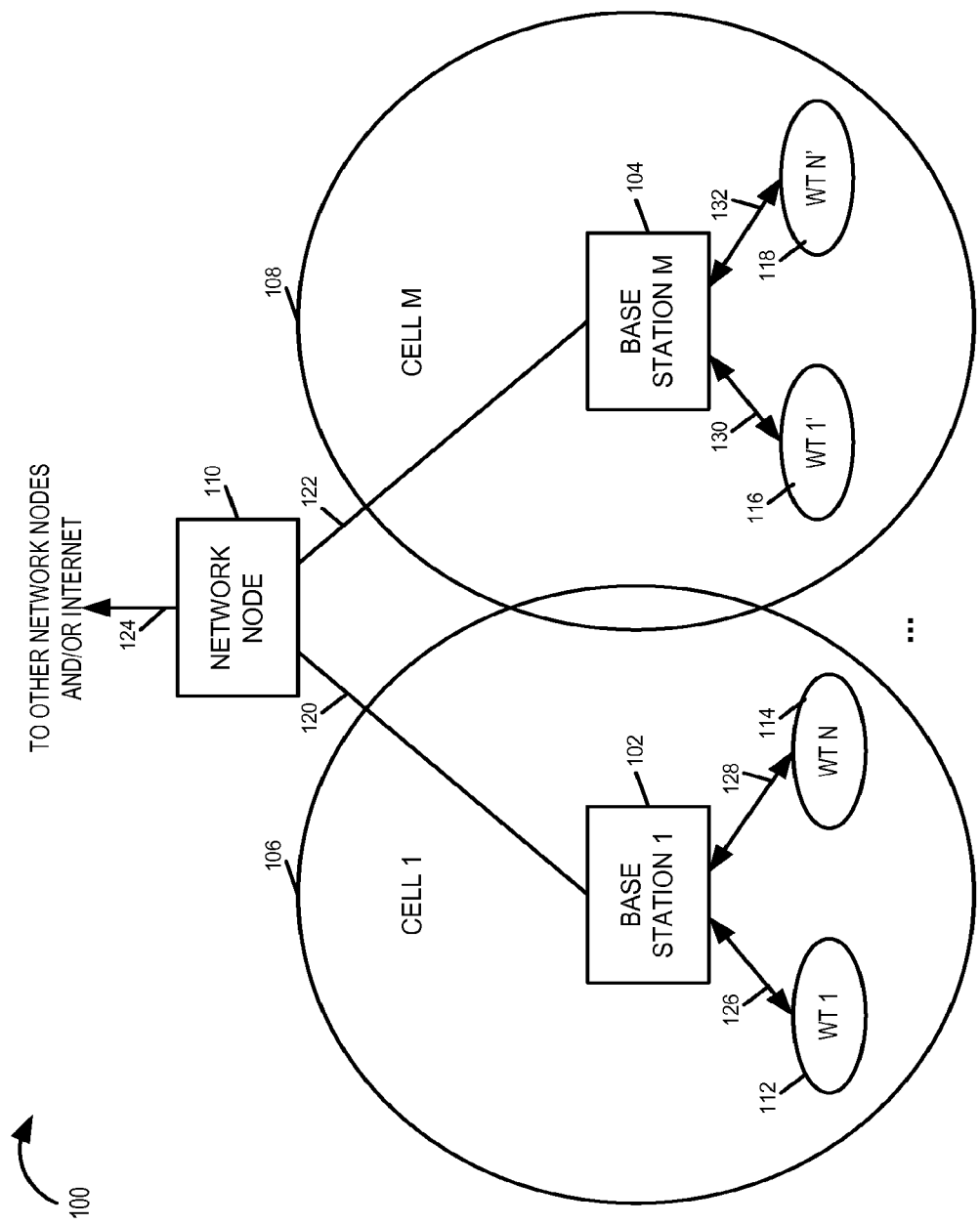
FIG. 1 is a drawing of an exemplary wireless communications system implemented in accordance with various embodiments.

FIG. 1 is a drawing of an exemplary wireless communications system 100, e.g., a multiple access OFDM wireless communications system, in accordance with various embodiments. Exemplary wireless communications system 100 includes a plurality of base stations (base station 1 102, . . . , base station M 104) and network node 110. Each base station (102, . . . , 104) includes at least one base station attachment point. Base stations (102, . . . , 104) may include one or more sectors and use one or more carriers. For example, a base station attachment point, in some embodiments for some base stations, corresponds to a combination of cell and carrier. In some embodiments, a base station attachment point for some base stations corresponds to a combination of cell, sector and carrier. Network node 110 is coupled to (base station 1 102, base station M 104) via networks links (120, 122), respectively. Network node 110 is also coupled to other network nodes and/or the Internet via network link 124. Network links 120, 122, 124 are, e.g., fiber optic links, wire links, and/or wireless links. Each base station (base station 1 102, base station M 104) has a corresponding wireless coverage area (cell 1 106, cell M 108), respectively.

Communications system 100 also includes a plurality of wireless terminals, e.g., mobile nodes, which may move throughout the system and attach to a base station in whose coverage area is the wireless terminal is currently situated. Wireless terminals (WT 1 112, . . . , WT N 114), currently situated in cell 1 106 are coupled to base station 1 102 via wireless links (126, . . . , 128), respectively. Wireless terminals (WT 1' 116, . . . , WT N' 118'), currently situated in cell M 108 are coupled to base station M 104 via wireless links (130, . . . , 132), respectively.

At least some of the base stations in system 100 consider loading information from other, e.g., adjacent base stations, in addition to their own loading, and adjust, e.g., dynamically, their downlink transmission power budget as a function of loading of other, e.g., adjacent base stations. In some embodiments, a base station makes its own independent determination of its downlink power budget corresponding to one of its base station attachment points, yet utilizes received loading information of other, e.g., adjacent base stations, in the local vicinity in making that determination.

Figure 2:
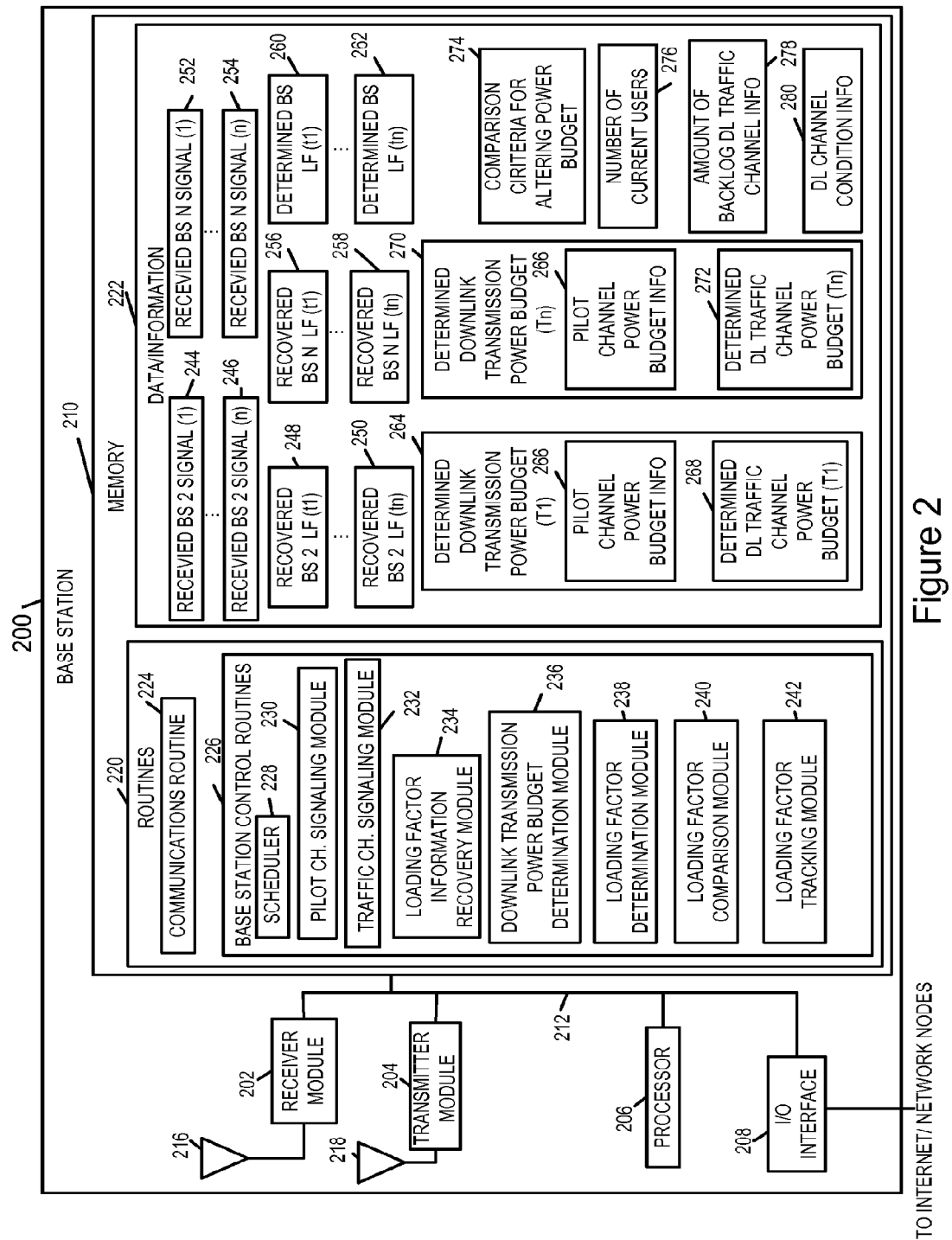
FIG. 2 is a drawing of an exemplary base station in accordance with various embodiments.

FIG. 2 is a drawing of an exemplary base station 200 implemented in accordance with various embodiments. Exemplary base station 200 may be any of the base stations of FIG. 1 or FIG. 4 or FIG. 5 or FIG. 6. Exemplary base station 200 includes a receiver module 202, a transmitter module 204, a processor 206, an I/O interface 208, and a memory 210 coupled together via a bus 212 over which the various elements may interchange data and information.

Receiver module 202, e.g., an OFDM receiver, is coupled to receive antenna 216 via which the base station 200 receives uplink signals from wireless terminals. In some embodiments, the uplink signals include base station load factor information corresponding to other base stations in the communications system, e.g., with a wireless terminal which is connected to base station 200 and another base station, e.g., an adjacent base station, acting as a relay.

Transmitter module 204, e.g., an OFDM transmitter, is coupled to transmit antenna 218 via which the base station 200 transmits downlink signals to wireless terminals. The downlink signals include traffic channel signals and pilot channel signals, with the power budget of the traffic channel signals being controlled as a function of load factor information corresponding to other, e.g., adjacent, base stations and load factor information corresponding to base station 200.

I/O interface 208 couples the base station 200 to the Internet and/or other network nodes, e.g., adjacent base stations. Load factor information is exchanged between base station 200 and other, e.g., adjacent base stations via I/O interface 208. Thus, I/O interface 208 receives signals communicating base station loading factor information indicative of loading of at least one base station attachment point corresponding to at least one other base station, e.g., an adjacent base station.

Memory 210 includes routines 220 and data/information 222. The processor 206, e.g., a CPU, executes the routines 220 and uses the data/information 222 in memory 210 to control the operation of the base station 200 and implement methods.

Routines 220 include a communications routine 224 and base station control routines 226. The communications routine 224 implements various communications protocols used by base station 200. Base station control routines 226 includes a scheduler 228, a pilot channel signaling module 230, a traffic channel signaling module 232, a loading factor information recovery module 234, a downlink transmission power budget determination module 236, a loading factor determination module 238, a loading factor comparison module 240, and a loading factor tracking module 242. In some embodiments, at least one of loading factor comparison module 240 and loading factor tracking module 242 are included as part of downlink transmission power budget determination module 236.

Scheduler 228 schedules wireless terminals to downlink and uplink traffic channel segments. Pilot channel signaling module 230 control the generation and transmission of pilot channel signals, e.g., known modulation symbols at predetermined power levels at predetermined positions in a recurring timing and frequency structure. In this exemplary embodiments, the pilot channel signals corresponding to a base station attachment point at transmitted at the same per tone transmission power level irrespective of downlink loading conditions at base station 200 or at adjacent base stations. Traffic channel signaling module 232 controls the generation and transmission of traffic channel segment signals, e.g., downlink traffic channel segment signals. The overall power budget associated with a base station 200 attachment point for the downlink traffic channels is dynamically adjusted in response to determinations by the downlink transmission power budget determination module 236. Individual subchannels within the downlink traffic channel, may be and sometimes are transmitted at different power levels.

Loading factor information recovery module 234 recovers loading factor information corresponding to base station attachment points of other, e.g., adjacent base stations from received signals. For example, loading factor information recovery module 234 obtains (recovered BS 2 LF (t1) 248, recovered BS 2 LF (tn) 250, recovered BS N LF (t1) 256, recovered BS N LF (tn) 258) from received signals (received BS 2 signal (1) 244, received BS 2 signal (n) 246, received BS N signal (1) 252, received BS N signal (n) 254), respectively. The loading factor information in various embodiments pertains to downlink transmission loading of base station attachment points, e.g., downlink traffic channel loading at a base station attachment point.

Downlink transmission power budget determination module 236 determines a downlink transmission power budget for one or more attachment points of the base station 200 as a function of recovered loading factor information corresponding to at least one other base station, e.g., one other adjacent base station. In various embodiments, the determined power budget is a power budget for a set of downlink communications channels including at least a pilot channel and a data traffic channel. In some such embodiments, a portion of the determined power budget for the pilot channel is independent of loading factor information and a portion of the power budget corresponding to the data traffic channel depends on the base station loading factor information of an other, e.g., adjacent, base station and the loading factor information of base station 200. For example, pilot channel signals may be transmitted at a per tone power level which does not vary as a function of loading, while traffic channel signal transmission power levels may be varied as a function of a determined load factor for a base station 200 attachment point and a received load factor corresponding to an attachment point of an adjacent base station. Results of loading factor comparison module 240 are used as input by determination module 236 Determined transmission power budget (time T1) 264 and determined transmission power budget (time Tn) 270 are outputs from determination module 236.

Loading factor determination module 238 determines, for each attachment point of base station 200, a loading factor corresponding to the attachment point of base station 200. Determined base station loading factor (time t1) 260 and determined base station loading factor (time tn) 262 represent outputs of determination module 236 corresponding to same base station 200 attachment point at different times.

Loading factor comparison module 240 compares a determined loading factor corresponding to an attachment point of base station 200 to a recovered loading factor corresponding to an attachment point of another, e.g., adjacent, base station.

In some embodiments, the downlink transmission power budget determination module 236 determines the power budget to correspond to a first value indicative of said budget when the loading factor comparison module 240 determines the loading of the attachment point of the other, e.g., adjacent, base station involved in the comparison to be greater than the loading of the attachment point of base station 200; and, the downlink transmission power budget determination module 236 determines the power budget to correspond to a second value indicative of a power budget greater than the power budget indicated by the first value when said loading factor comparison module 240 determines the loading of the attachment point of the other, e.g., adjacent, base station involved in the comparison to be less than the loading of the attachment point of base station 200.

In some embodiments, a heavily loaded base station sends its loading factor to an adjacent base station, in the expectation, that the base station receiving the Loading factor will have lower loading and will reduce its transmission power budget. This in turn will reduce interference being experienced by the heavily loaded base station and allow throughput at the heavily loaded base station to be increased.

Loading factor tracking module 242 tracks changes in loading factors at base station attachment points, e.g., attachment points corresponding to both base station 200 and attachment points corresponding to other, e.g., adjacent, base stations. Detected changes identified by loading factor tracking module 242 are used by downlink transmission power budget determination module 236 in determining a power budget for a base station attachment point of base station 200.

In some embodiments, the downlink transmission power determination module 236 decreases a current power budget of an attachment point of base station 200 in response to a detected increase in loading at an other, e.g., adjacent, base stations, and the downlink transmission power determination module 236 increases the current power budget in response to a detected decrease in loading at an other, e.g., adjacent, base station. In some embodiments, the downlink transmission power determination module 236 increases a current power budget of an attachment point of base station 200 in response to a detected increase in loading at the attachment point of base station 200, and the downlink transmission power determination module 236 decreases the current power budget in response to a detected decrease in loading at the attachment point of base station 200.

Data/information 222 includes received signals conveying loading factor information corresponding to a plurality of base stations over time (received base station 2 signal (1) 244, . . . , received base station 2 signal (n) 246)), . . . , (received base station N signal (1) 252, . . . , received base station N signal (a) 254). The received signals conveying load factor information, in some embodiments, have been conveyed via the backhaul network through I/O interface 208. In some embodiments, the received signals have been received via receiver 202, e.g., with a wireless terminal coupled to two base stations relaying the information. Data/information 210 also includes recovered base station 2 loading factor information representing the base station 2 loading at different times (recovered BS 2 loading factor (t1) 248, . . . , recovered BS 2 loading factor (tn) 250), recovered base station N loading factor information representing the base station N loading at different times (recovered BS N loading factor (t1) 256, . . . , recovered BS N loading factor (tn) 258), and determined BS 200 loading factor information representing the base station 200 loading at different times (determined BS loading factor (t1) 260, . . . determined BS loading factor (tn) 262).

Data/information 222 also includes determined downlink power budget information over time for BS 200 (determined downlink transmission power budget (T1) 264, . . . , determined downlink transmission power budget (Tn) 270. Determined downlink transmission power budget information 264 includes pilot channel budget information 266 and determined downlink traffic channel budget information (T1) 268, while determined downlink transmission power budget (Tn) 270 includes pilot channel power budget information 266 and determined downlink traffic channel power budget (Tn) 272. In this exemplary embodiment, the pilot channel signal transmission power level does not channel as a function of loading conditions; however, the downlink traffic channel power budget can, and sometimes does, change as a function of loading conditions and/or loading condition changes, e.g., at an adjacent base station and/or at base station 200.

Data/information 222 also includes comparison criteria for altering power budget 274, number of current users 276, amount of backlog downlink traffic information 278, and downlink channel condition information. Comparison criteria for altering power budget 274 includes predetermined threshold limits used loading factor comparison module 1340, loading factor tracking module 242, and/or downlink transmission power budget determination module 236. Number of current users 276 includes, e.g., information corresponding to the number of currently registered users, the number of active users, and/or the number of ON state users at a base station 200 attachment point. Amount of backlog downlink traffic channel information 278 includes, e.g., information identifying the number of MAC frames of downlink traffic awaiting to be transmitted corresponding to each of the current users of base station 200 and information identifying the number of MAC frames of downlink traffic awaiting to be transmitted corresponding to the composite of registered users. Downlink channel conditions information 280 includes, e.g., channel condition measurement information corresponding to current users of base station 200, e.g., signal-to-noise measurement information and/or signal-to-interference measurement information. At least some of the number of current users information 276, amount of backlog downlink traffic channel information 278 and downlink channel condition information 280 is used by the loading factor determination module 238 in determining a loading factor corresponding to a base station 200 attachment point.

Figure 3:
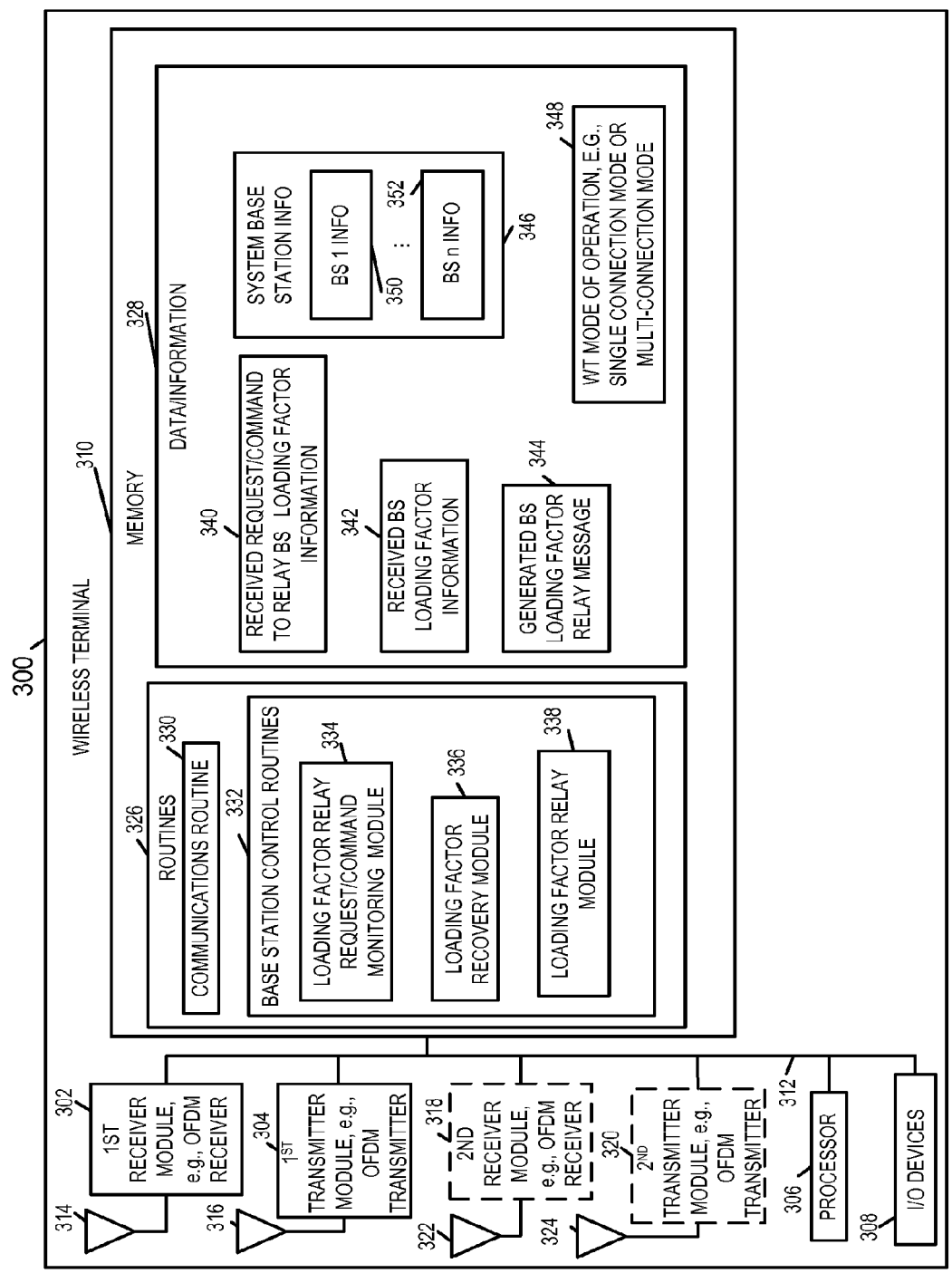
FIG. 3 is a drawing of an exemplary wireless terminal in accordance with various embodiments.

FIG. 3 is a drawing of an exemplary wireless terminal 300, e.g., mobile node, in accordance with various embodiments. Exemplary wireless terminal 300 may be any of the exemplary wireless terminals of FIG. 1 or FIG. 4 or FIG. 5 or FIG. 6. Exemplary wireless terminal 300 includes a $1^{st}$ receiver module 302, a $1^{st}$ transmitter module 304, a processor 306, I/O devices 308, and a memory 310 coupled together via a bus 312 over which the various elements may interchange data information. In sonic embodiments wireless terminal 300 also includes a $2^{nd}$ receiver module 318 and a $2^{nd}$ transmitter module 320 also coupled to bus 312.

$1^{st}$ receiver module 302, e.g., an OFDM receiver, is coupled to receive antenna 314 via which the wireless terminal 300 receives downlink signals from base stations. The downlink signals include assignment signals, e.g., downlink traffic channel segment assignment signals, downlink traffic channel segment signals, requests for the wireless terminal to relay base station loading information, commands for the wireless terminal to relay base station loading information, and/or base station attachment point loading information.

$1^{st}$ transmitter module 304, e.g., an OFDM transmitter, is coupled to transmit antenna 316 via which the wireless terminal 300 transmits uplink signals to base stations. In some embodiments, the same antenna is used for receiver module 302 and transmitter module 304, e.g., in conjunction with a duplex module. The uplink signals include dedicated control channel reports, e.g., SNR reports, uplink traffic channel segment signals, access signals, power control signals, timing control signals, and handoff signals. The uplink signals also include messages conveying loading factor information corresponding to a base station attachment point, e.g., with the wireless terminal acting as relay between two adjacent base stations.

$2^{nd}$ receiver module 318, e.g., an OFDM receiver, is coupled to receive antenna 322 via which the wireless terminal 300 receives downlink signals from base stations. The downlink signals include assignment signals, e.g., downlink traffic channel segment assignment signals, downlink traffic channel segment signals, requests for the wireless terminal to relay base station loading information, commands for the wireless terminal to relay base station loading information, and/or base station attachment point loading information.

$2^{nd}$ transmitter module 320, e.g., an OFDM transmitter, is coupled transmit antenna 324 via which the wireless terminal 300 transmits uplink signals to base stations. In some embodiments, the same antenna is used for receiver module 318 and transmitter module 324, e.g., in conjunction with a duplex module. The uplink signals include dedicated control channel reports, e.g., SNR reports, uplink traffic channel segment signals, access signals, power control signals, timing control signals, and handoff signals. The uplink signals also include messages conveying loading information, e.g., a downlink loading factor, corresponding to a base station attachment point, e.g., with the wireless terminal acting as relay between two base stations.

I/O devices 308, e.g., keypad, keyboard, microphone, switches, display, speaker, etc., allows a user of WT 300 to input data/information, access output data/information. Input devices 308 also allow a user to control at least some functions of the wireless terminal, e.g., initiate a communications session with a peer node.

Memory 310 includes routines 326 and data/information 328. The processor 306, e.g., a CPU, executes the routines 326 and uses the data/information 328 in memory 310 to control the operation of the wireless terminal 300 and implement steps of methods. Routines 326 include a communications routine 330 and base station control routines 332. The communications routine 330 implements various communications protocols used by the wireless terminal 300. The base station control routines 332 include a loading factor relay request/command monitoring module 334, a loading factor recovery module 336, and a loading factor relay module 338.

The loading factor request/command monitoring module 334 monitors received downlink signaling for a request and/or command directed to wireless terminal 300 instructing the wireless terminal 300 to receive base station loading factor information, e.g., downlink traffic channel base station loading information, corresponding to one or more attachment points from a first base station and to relay the loading factor information to a second base station. In some embodiments, the loading factor relay request/command monitoring module 334 is used when the wireless terminal 300 is in a mode of wireless terminal operation, wherein the wireless terminal is simultaneously supporting two communication links to two different base station attachment points. For example WT 300 may be in a multi-connection mode of operation, currently coupled to a first base station via receiver/transmitter module pair (302/304) and concurrently coupled to a second base station via receiver/transmitter module pair (318/320), and monitoring module 334 detects a signal requesting or commanding the wireless terminal 300 to transfer downlink loading information about a first base station attachment point to the second base station. In some embodiments, if a wireless terminal receives a request to transfer loading factor information, and the wireless terminal is not in multi-connection mode, the wireless terminal may transition into multi-connection mode in response to the received request/command to transfer loading factor information.

The loading factor recovery module 336, which is responsive to a request or command detected by module 334, recovers loading information, e.g., downlink base station attachment point loading information from received downlink signals. The loading factor relay module 336, which is responsive to loading factor recovery module 336, generates messages conveying recovered loading factor information which is to be communicated, via uplink signaling to another, e.g., adjacent, base station. Loading factor relay module 336 also controls the transmission of such generated relay messages.

Data/information 328 includes received request/command to relay loading factor information 340, received base station loading factor information 342, generated base station loading factor message information 344, system base station information 346 and wireless terminal mode of operation information 348. Received request/command to relay base station loading factor information 340 includes received requests and/or commands for wireless terminal 300 to serve as a relay and transfer loading factor information between base stations. In some embodiments, the request identifies the destination base station. In some embodiments, the wireless terminal, uses stored system base station information 346 to determine relevant destination base stations, e.g., adjacent base stations which may be affected, e.g., interfered with, by downlink signaling from the source base station attachment point. Received base station loading factor information 342, e.g., a base station attachment point loading factor corresponding to downlink traffic channel loading, is an output of recovery module 336 and an input to loading factor relay module 338. Generated base station loading factor relay message is an output of loading factor relay module 338 and used as input a wireless transmitter module, e.g., module 304 or module 320. System base station information 346 includes information corresponding to a plurality of base stations in the wireless communications system (base station 1 information 350, . . . , base station n information 352). Base station 1 information 350 includes information corresponding to each of the attachment point of base station 1, e.g., downlink carrier information, downlink tone block information, uplink carrier information, uplink carrier information, channel structure information, tone hopping information, power level information, message structure information, recurring timing structure information, etc. WT mode of operation information 348 includes information identifying whether the wireless terminal 300 is in a single connection mode of operation or a multi-connection mode of operation.

Figure 4:
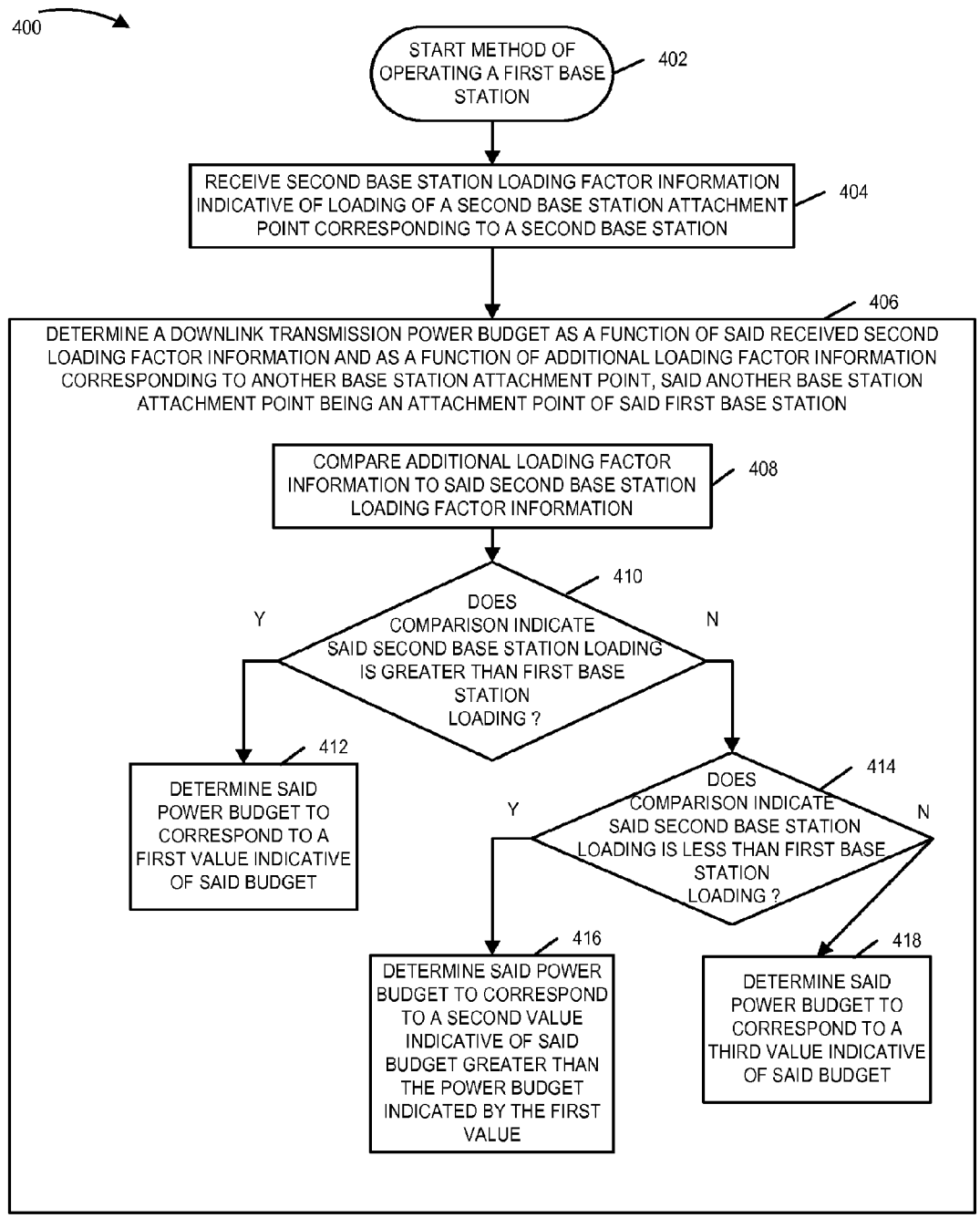
FIG. 4 is a drawing of a flowchart of an exemplary method of operating a first base station, in a multiple access wireless communications system including a plurality of base stations, in accordance with various embodiments.

FIG. 4 is a drawing of a flowchart 400 of an exemplary method of operating a first base station, in a multiple access wireless communications system including a plurality of base stations, in accordance with various embodiments. Each base station in the exemplary communications system includes at least one base station attachment point via which wireless terminals, e.g., mobile nodes, in the vicinity of the base station may attach to the network. A base station may include one or more sectors. A base station attachment point corresponds, in this exemplary embodiment, to a base station sector, uplink carrier, uplink OFDM tone block, downlink carrier, and downlink OFDM tone block.

Operation starts in step 402, where the first base station is powered on and initialized, and proceeds to step 404. In step 404, the first base station receives second base station loading factor information indicative of loading of a second base station attachment point corresponding to a second base station. The second base station may be and sometimes is adjacent to the first base station. Exemplary loading information of a base station includes the number of active terminals connected, the quality of service (QoS) profile of those terminals (e.g., the number of high QoS value terminals versus the number of low QoS value terminals), the QoS profile of the traffic associated with those terminals (e.g., the amount of voice or video traffic versus the amount of best-effort data traffic), and the air link resource (e.g., power and bandwidth) required to support the traffic desired by the connected active terminals. For example, the loading may increase when the base station serves increased voice traffic. Moreover, even if the base station serves the same amount of traffic in terms of bits per second, the loading may be different if most of the connected terminals are far way from the base station versus if most of them are close by. The reason is that the air link resource, in particular, the power, required to support the traffic is different. Operation proceeds from step 404 to step 406.

In step 406, the first base station determines a downlink transmission power budget as a function of additional loading factor information corresponding to another base station attachment point, said another base station attachment point being an attachment point of the first base station. For example, the another attachment point of the first be station and the second attachment point of the second base station may correspond to adjacent sectors using the same downlink carrier frequencies and same downlink tone blocks, and the determined downlink transmission power budget may correspond to the another base station attachment point of the first base station. In some embodiments, the determined downlink transmission power budget is for a set of downlink communications channels including at least a pilot channel and a data traffic channel. In some such embodiments, a first portion of the determined power budget, the first portion being allocated for the pilot channel, is independent of the first and second loading factor information, and a second portion of the determined power budget, the second portion being allocated to correspond to data traffic channels depends on the second base station loading factor information and additional loading factor information. For example, pilot channel signals corresponding to the additional attachment point of the first base station are broadcast at a first predetermined transmission power level irrespective of loading conditions of second and additional loading factor information; however, traffic channel signals corresponding to the additional attachment point of the first base station are transmitted at power levels which are a function of second and additional loading factor information. Step 406 includes sub-steps 408, 410, 412, 414, 416 and 418.

In sub-step 408, the first base station compares the additional loading factor information of the first base station to said second base station loading factor information. The loading factor information being compared may refer to the downlink, e.g., to downlink loading of downlink traffic channel air link resources. Operation proceeds from sub-step 408 to sub-step 410. In sub-step 410, the first base station determines if the comparison of sub-step 408 indicates that the second base station loading is greater than the first base, station loading. If the check of step 410 indicates that the second base station loading is greater than the first base station loading, then operation proceeds to step 412, where the base station determines the power budget to correspond to a first value indicative of said budget; otherwise operation proceeds from sub-step 410 to sub-step 414.

In sub-step 414, the first base station determines if the comparison of sub-step 408 indicates that the second base station loading is less than the first base station loading. If the check of step 414 indicates that the second base station loading is less than the first base station loading, then operation proceeds to sub-step 416, where the base station determines the power budget to correspond to a second value indicative of said budget greater than die power budget indicated by the first value; otherwise operation proceeds from sub-step 414 to sub-step 418. In sub-step 418, the first base station determines said power budget to correspond to a third value indicative of said budget. For example, the third value may indicate a power budget between the power budget indicated by the first value and the power budget indicated by the second value.

In some embodiments, the values of the base station loading which are to be compared in steps 410 and 420 are quantized representations of actual loading determinations and proceeding to step 418 may indicate that the first and second base station loading quantized level values are the same, indicating that the first and second base station actual loading determinations are roughly the same.

In some embodiments, step 410 checks whether the second base station loading is greater than the second base station loading by a predetermined first amount, and step 410 checks whether the second base station loading is greater than the first base station loading by a predetermined second amount. Thus, if operation proceeds to step 418, that indicates that the first and second base station loadings are roughly the same.

Figure 5:
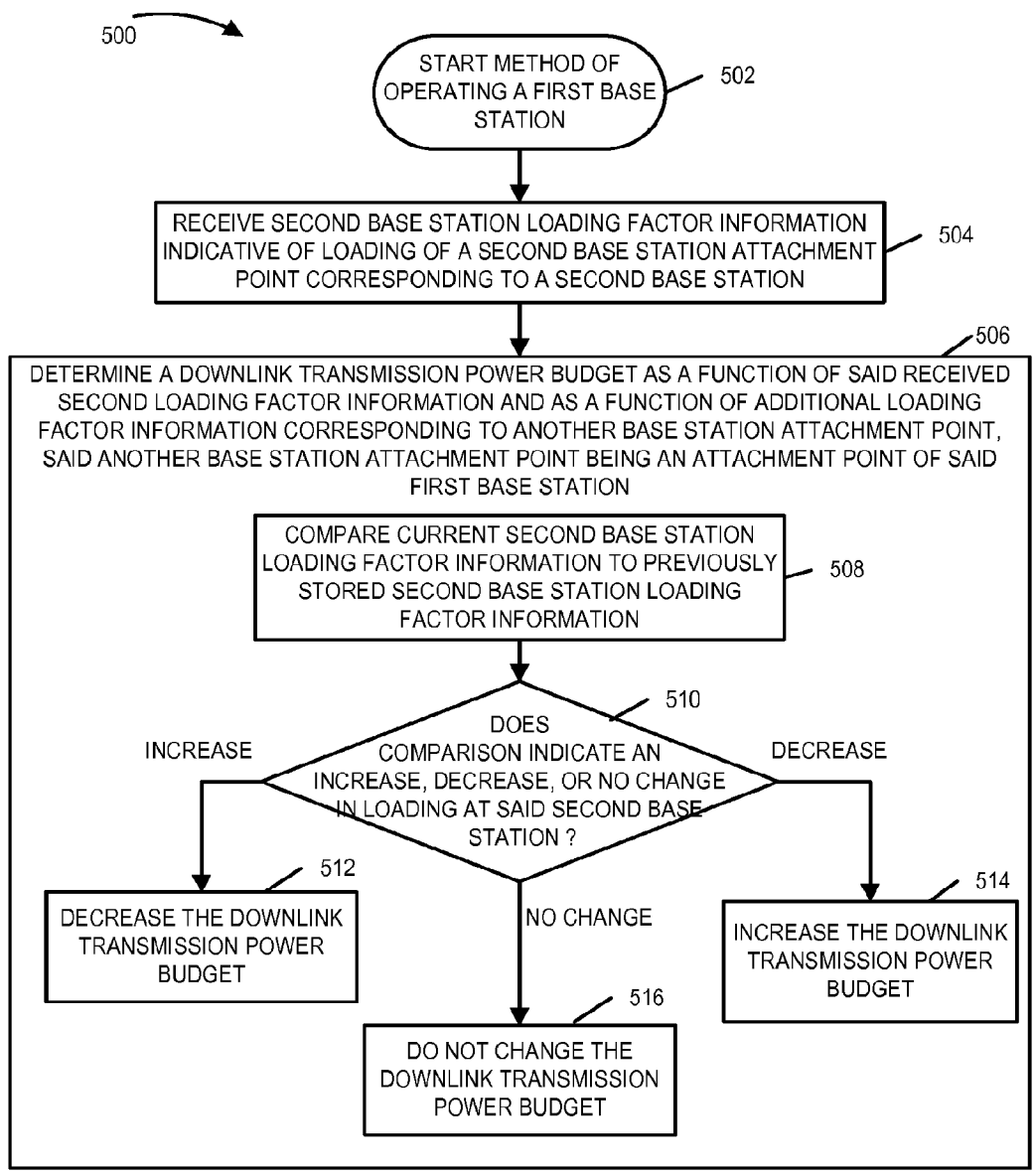
FIG. 5 is a drawing of a flowchart of an exemplary method of operating a first base station, in a multiple access wireless communications system including a plurality of base stations, in accordance with various embodiments.

FIG. 5 is a drawing of a flowchart 500 of an exemplary method of operating a first base station, in a multiple access wireless communications system including a plurality of base stations, in accordance with various embodiments. Each base station in the exemplary communications system includes at least one base station attachment point via which wireless terminals, e.g., mobile nodes, in the vicinity of the base station may attach to the network. A base station may include one or more sectors. A base station attachment point corresponds, in this exemplary embodiment, to a base station sector, uplink carrier, uplink OFDM tone block, downlink carrier, and downlink OFDM tone block.

Operation starts in step 502, where the first base station is powered on and initialized, and proceeds to step 504. In step 504, the first base station receives second base station loading factor information indicative of loading of a second base station attachment point corresponding to a second base station. The second base station may be and sometimes is adjacent to the first base station. Operation proceeds from step 504 to step 506.

In step 506, the first base station determines a downlink transmission power budget as a function of additional loading factor information corresponding to another base station attachment point, said another base station attachment point being an attachment point of the first base station. For example, the another attachment point of the first base station and the second attachment point of the second base stations may correspond to adjacent sectors using the same downlink carrier frequencies and same downlink tone blocks, and the determined downlink transmission power budget may correspond to the another base station attachment point of the first base station. In some embodiments, the determined downlink transmission power budget is for a set of downlink communications channels including at least a pilot channel and a data traffic channel. In some such embodiments, a first portion of the determined power budget, the first portion being allocated for the pilot channel, is independent of the first and second loading factor information, and a second portion of the determined power budget, the second portion being allocated to correspond to data traffic channels depends on the second base station loading factor information and additional loading factor information. For example, pilot channel signals corresponding to the additional attachment point of the first base station are broadcast at a first predetermined transmission power level irrespective of loading conditions of second and additional loading factor information; however, traffic channel signals corresponding to the additional attachment point of the first base station are transmitted at power levels which are a function of second and additional loading factor information. Step 506 includes sub-steps 508, 510, 512, 514 and 516.

In sub-step 508, the first base station compares the current second base station loading factor information to previously stored second base station loading factor information. The loading factor information being compared may refer to the downlink, e.g., to downlink loading of downlink traffic channel air link resources. Operation proceeds from sub-step 508 to sub-step 510. In sub-step 510, the first base station determines if the comparison of sub-step 508 indicates an increase, decrease, or no change in loading at said second base station. If the determination of step 510 is that loading of the second attachment point at the second base station has increased, operation proceeds to step 512, where the first base station decreases the downlink transmission power budget. If the determination of step 510 is that the loading at the second base station has not changed, then operation proceeds from step 510 to step 516, were the first base station does not change the downlink transmission power budget. If the determination of step 510 is that loading of the second at the second base station has decreased, operation proceeds to step 514, where the first base station increases the downlink transmission power budget.

Figure 6:
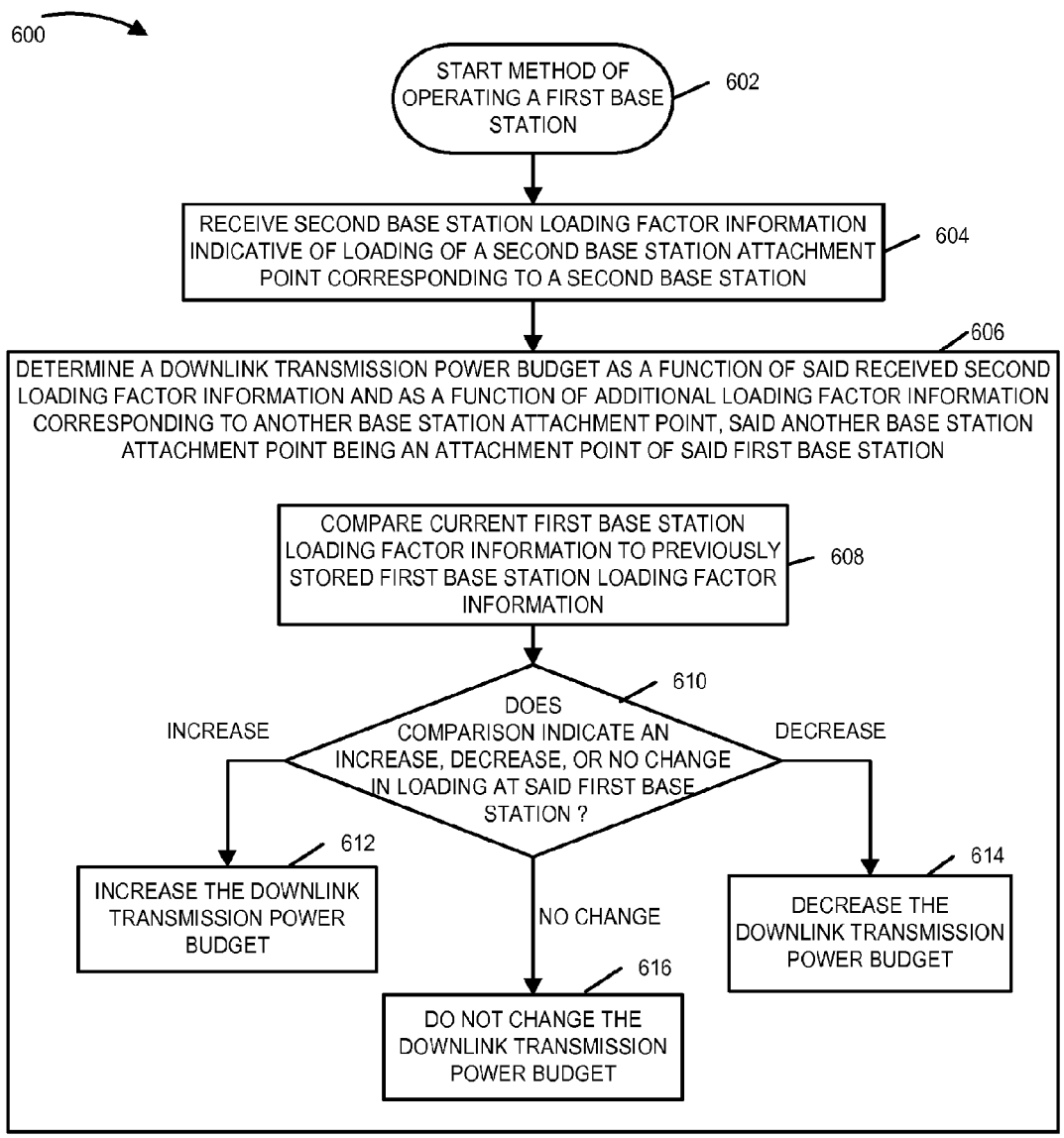
FIG. 6 is a drawing of a flowchart 600 of an exemplary method of operating a first base station, in a multiple access wireless communications system including a plurality of base stations, in accordance with various embodiments.

FIG. 6 is a drawing of a flowchart 600 of an exemplary method of operating a first base station, in a multiple access wireless communications system including a plurality of base stations, in accordance with various embodiments. Each base station in the exemplary communications system includes at least one base station attachment point via which wireless terminals, e.g., mobile nodes, in the vicinity of the base station may attach to the network. A base station may include one or more sectors. A base station attachment point corresponds, in this exemplary embodiment, to a base station sector, uplink carrier, uplink OFDM tone block, downlink carrier, and downlink OFDM tone block.

Operation starts in step 602, where the first base station is powered on and initialized, and proceeds to step 604. In step 604, the first base station receives second base station loading factor information indicative of loading of a second base station attachment point corresponding to a second base station. The second base station may be, and sometimes is, adjacent to the first base station. Operation proceeds from step 604 to step 606.

In step 606, the first base station determines a downlink transmission power budget as a function of additional loading factor information corresponding to another base station attachment point, said another base station attachment point being an attachment point of the first base station. For example, the another attachment point of the first base station and the second attachment point of the second base station may correspond to adjacent sectors using the same downlink carrier frequencies and same downlink tone blocks, and the determined downlink transmission power budget may correspond to the another base station attachment point of the first base station. In some embodiments, the determined downlink transmission power budget is for a set of downlink communications channels including at least a pilot channel and a data traffic channel. In some such embodiments, a first portion of the determined power budget, the first portion being allocated for the pilot channel, is independent of the first and second loading factor information, and a second portion of the determined power budget, the second portion being allocated to correspond to data traffic channels depends on the second base station loading factor information and additional loading factor information. For example, pilot channel signals corresponding to the additional attachment point of the first base station are broadcast at a first predetermined transmission power level irrespective of loading conditions of second and additional loading factor information; however, traffic channel signals corresponding to the additional attachment point of the first base station are transmitted at power levels which are a function of second and additional loading factor information. Step 606 includes sub-steps 608, 610, 612, 614 and 616.

In sub-step 608, the first base station compares the current first base station loading factor information to previously stored first base station loading factor information. The loading factor information being compared may refer to the downlink, e.g., to downlink loading of downlink traffic channel air link resources. Operation proceeds from sub-step 608 to sub-step 610. In sub-step 610, the first base station determines if the comparison of sub-step 608 indicates an increase, decrease, or no change in loading at said first base station. If the determination of step 610 is that loading of the additional attachment point at the first base station has increased, operation proceeds to step 612, where the first base station increases the downlink transmission power budget. If the determination of step 610 is that the loading at the first base station has not changed, then operation proceeds from step 610 to step 616, where the first base station does not change the downlink transmission power budget. If the determination of step 610 is that loading at the first base station has decreased, operation proceeds to step 614, where the first base station decreases the downlink transmission power budget.

Figure 7:
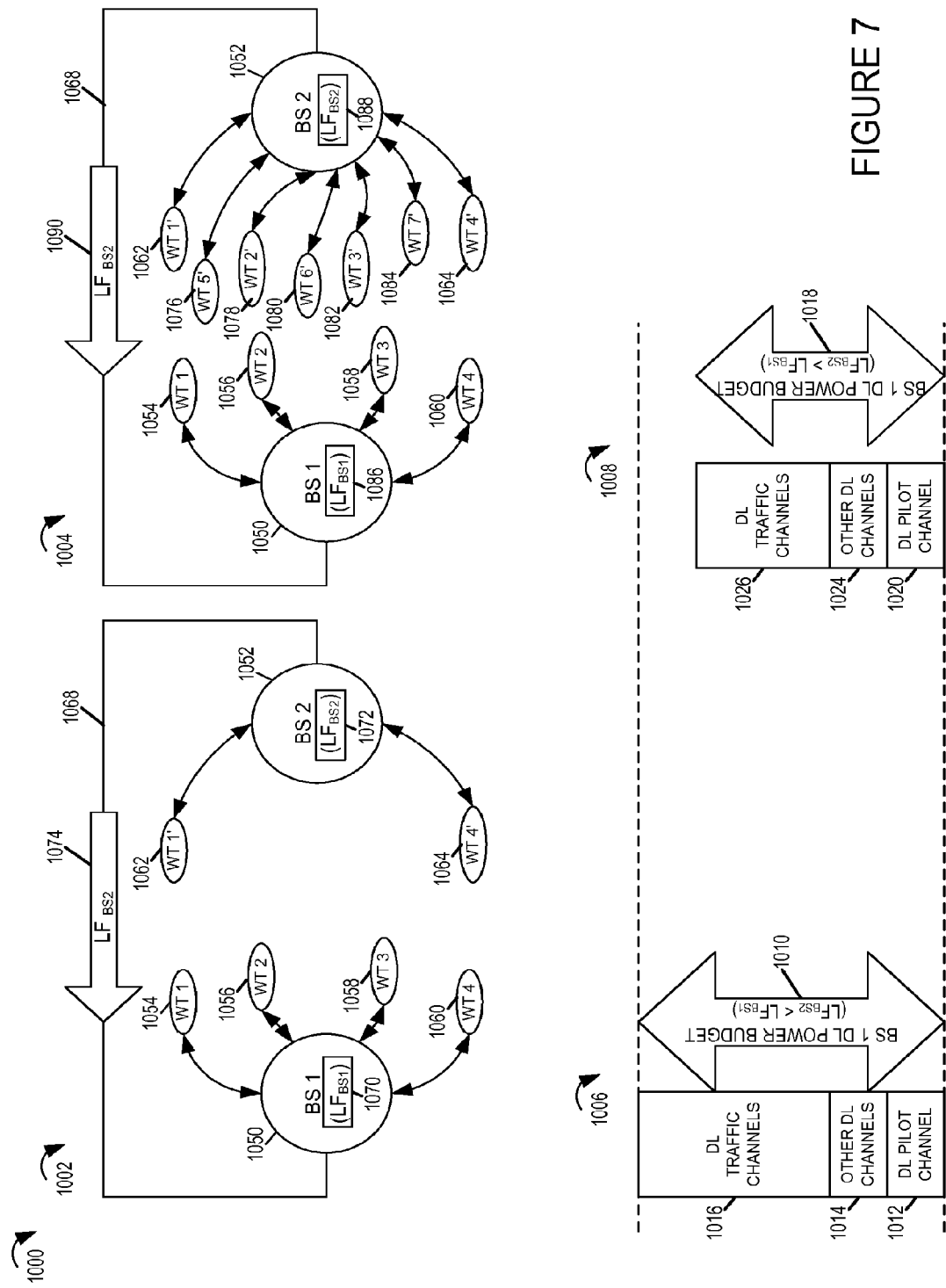
FIG. 7 is a drawing used to illustrate features of various embodiments in which a base station in a wireless communication system including a plurality of base stations receives loading factor information corresponding to another base station and determines a downlink transmission power budget as a function of said received base station loading factor information.

FIG. 7 is a drawing 1000 used to illustrate features of various embodiments in which a base station in a wireless communication system including a plurality of base stations receives loading factor information corresponding to another base station and determines a downlink transmission power budget as a function of said received base station loading factor information. Drawing 1000 includes exemplary drawing 1002 which includes base station 1 1050 and base station 2 1052 coupled together via network link 1068. Base station 1 1050 is coupled to a plurality of wireless terminals (Wt 1 1054, WT 2 1056, WT 3 1058, WT 4 1060) via wireless links. Base station 2 1052 is coupled to a plurality of wireless terminals (WT 1' 1062, WT 4' 1064) via wireless links. BS 1 1050 has calculated a loading factor 1071 corresponding to its current downlink traffic channel loading. BS 2 1052 has calculated a loading factor 1072 corresponding to its current downlink traffic channel loading. BS 2 sends message 1074 via backhaul network link 1068 conveying its loading factor 1072. BS 1 1052 receives the loading factor message 1074 recovers the loading factor corresponding to BS 2 1072 and compares loading factor 1072 to its own loading factor 1070.

BS 1 determines that the loading factor for BS 2 1072 is less than its own loading factor 1070 and therefore sets its downlink transmission power budget at a first level. Drawing 1006 of drawing 1000 illustrates the downlink power budget for BS 1 corresponding to the drawing 1002 example. In drawing 1006, the height of arrow 1010 indicates the BS 1 downlink power budget for the determined condition that the loading factor of base station 2 is less than the loading factor of base station 1. Downlink power budget 1010 can be partitioned into a $1^{st}$ portion 1012 associated with the downlink pilot channel, a second portion associated with downlink traffic channels 1016, and a third portion associated with other downlink channels 1014.

Drawing 1000 also includes exemplary drawing 1004 which includes base station 1 1050 and base station 2 1052 coupled together via network link 1068. Base station 1 1050 is coupled to a plurality of wireless terminals (WT 1 1054, WT 2 1056, WT 3 1058, WT 4 1060) via wireless links. Base station 2 1052, at this time, is coupled to a plurality of wireless terminals (WT 1' 1062, WT 4' 1064, WT 5' 1076, WT 2' 1078, WT 6' 1080, WT 3' 1082, WT 7' 1084) via wireless links. BS 1 1050 has calculated a loading factor 1086 corresponding to its current downlink traffic channel loading. BS 2 1052 has calculated a loading factor 1088 corresponding to its current downlink traffic channel loading. BS 2 sends message 1090 via backhaul network link 1068 conveying its loading factor 1088. BS 1 1052 receives the loading factor message 1090 recovers the loading factor corresponding to BS 2 1088 and compares loading factor 1088 to its own loading factor 1086. BS 1 determines that the loading factor for BS 2 1088 is greater than its own loading factor 1086 and therefore sets its downlink transmission power budget at a second level 1018, the second level being less than the first level 1010. Drawing 1008 of drawing 1000 illustrates the downlink power budget for BS 1 corresponding to the drawing 1004 example. In drawing 1008, the height of arrow 1018 indicates the BS 1 downlink power budget for the determined condition that the loading factor of base station 2 is greater than the loading factor of base station 1. Downlink power budget 1018 can be partitioned into a $1^{st}$ portion 1020 associated with the downlink pilot channel, a second portion associated with downlink traffic channels 1026, and a third portion associated with other downlink channels 1024. In this example, it should be observed that the power level associated with the pilot channel 1012, 1020 is the same irrespective of the loading factor comparison determination; however, the downlink traffic channel power budget (1016, 1026) changes in response to different results from the loading factor comparison.

Figure 8:
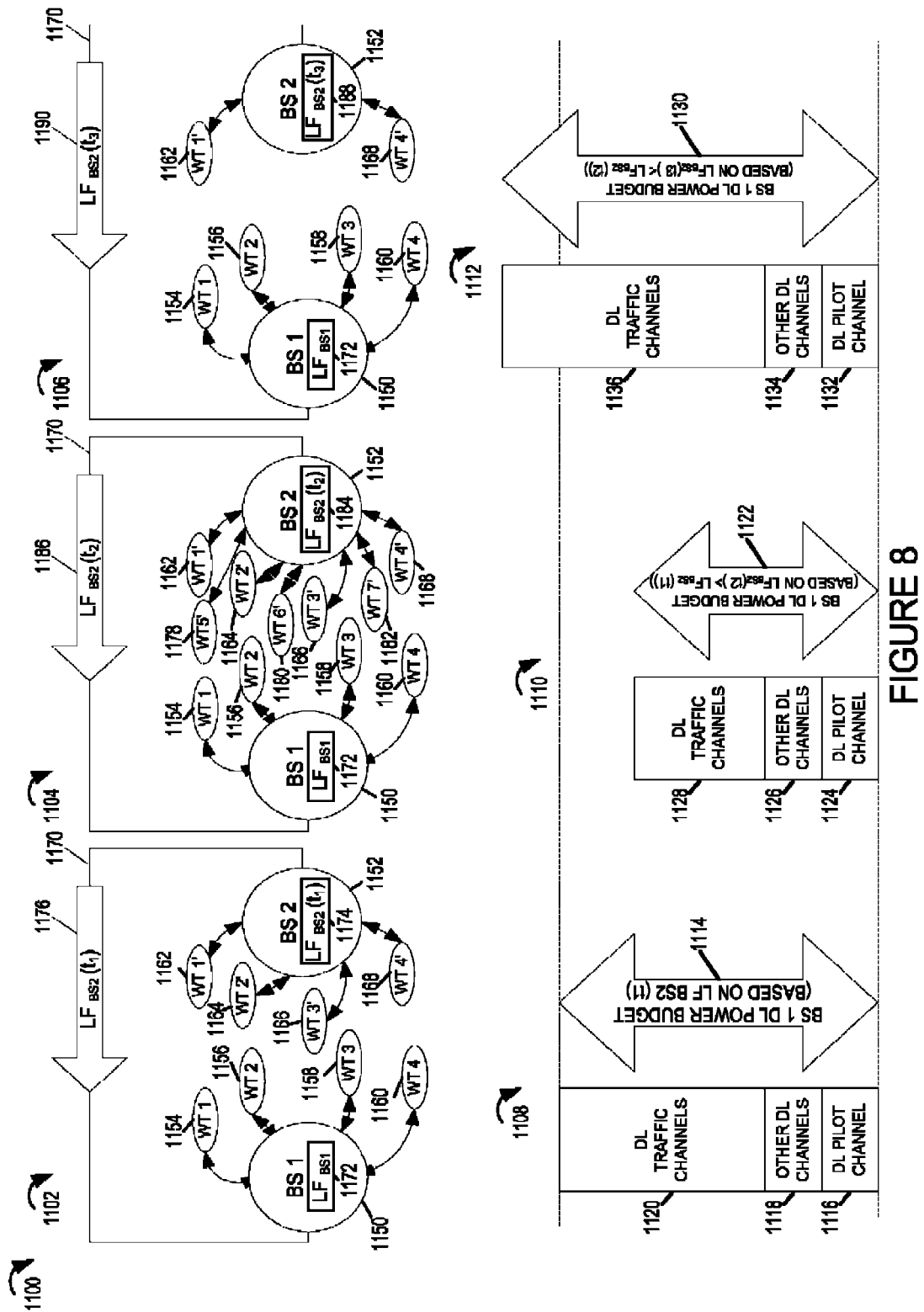
FIG. 8 is a drawing used to illustrate features of various embodiments in which a base station in a wireless communication system including a plurality of base stations receives loading factor information corresponding to another base station and determines a downlink transmission power budget as a function of said received base station loading factor information.

FIG. 8 is a drawing 1100 used to illustrate features of various embodiments in which a base station in a wireless communication system including a plurality of base stations receives loading factor information corresponding to another base station and determines a downlink transmission power budget as a function of said received base station loading factor information. Drawing 1000 includes exemplary drawing 1102 which includes base station 1 1150 and base station 2 1152 coupled together via network link 1170. Base station 1 1150 is coupled to a plurality of wireless terminals (WT 1 1154, WT 2 1156, WT 3 1158, T 4 1160) via wireless links. Base station 2 1152 is coupled to a plurality of wireless terminals (WT 1' 1162, WT 2' 1164, WT 3' 1166, WT 4' 1168) via wireless links. BS 1 1150 has calculated a loading factor 1172 corresponding to its current downlink traffic channel loading. BS 2 1152 has calculated a loading factor 1174 corresponding to its current downlink traffic channel loading. BS 2 sends message 1176 via backhaul network link 1170 conveying its loading factor ($LF_{BS2}$ (t1)) 1174. BS 1 1150 receives the loading factor message 1176 recovers the loading factor corresponding to BS 2 1174 and compares loading factor 1174 to its own loading factor 1172. In this example, BS 1 determines that the loading factor for BS 2 1174 is the same as its own loading factor 1172, and for purposes of illustration we will assume that both base station have been stable at these levels, and therefore base station 1 does not readjust its power budget which is set at level 1114. Drawing 1108 of drawing 1100 illustrates the downlink power budget for BS 1 corresponding to the drawing 1102 example. In drawing 1108, the height of arrow 1114 indicates the BS 1 downlink power budget. Downlink power budget 1114 can be partitioned into a $1^{st}$ portion 1116 associated with the downlink plot channel, a second portion associated with downlink traffic channels 1120, and a third portion associated with other downlink channels 1118.

Drawing 1100 also includes exemplary drawing 1104 which includes base station 1 1150 and base station 2 1152 coupled together via network link 1170. Base station 1 1150 is coupled to a plurality of wireless terminals (WT 1 1154, WT 2 1156, WT 3 1158, WT 4 1160) via wireless links. Base station 2 1152, at this tine is coupled to a plurality of wireless terminals (WT 1' 1162, WT 2' 1164, WT 3' 1166, WT 4' 1168, WT 5' 1178, WT 6' 1180, WT 7' 1182) via wireless links. BS 1 1150 has calculated a loading factor 1172 corresponding to its current downlink traffic channel loading. BS 2 1152 has calculated a loading factor ($LF_{BS2}$ (t2)) 1184 corresponding to its current downlink traffic channel loading. BS 2 sends message 1186 via backhaul network link 1170 conveying its loading factor 1184. BS 1 1150 receives the loading factor message 1186, recovers the loading factor corresponding to BS 2 1184 and compares loading factor 1184 to a previously stored loading factor corresponding to BS 2 ($LF_{BS\ 2}$ (t1)) 1174. BS 1 determines that the current loading factor for BS 2 1184 is greater than the previous loading factor for BS 2 1174 and therefore reduces its downlink transmission power budget to level 1122. Drawing 1110 of drawing 1100 illustrates the downlink power budget for BS 1 corresponding to the drawing 1104 example. In drawing 1110, the height of arrow 1122 indicates the BS 1 adjusted downlink power budget for the determined condition that the currents loading factor of base station 2 is greater than the previous loading factor of base station 2. Downlink power budget 1122 can be partitioned into a $1^{st}$ portion 1124 associated with the down link pilot channel, a second portion associated with downlink traffic channels 1128, and a third portion associated with other downlink channels 1126. In this example, it should be observed that the power level associated with the pilot channel 1116, 1124 is the same irrespective of the loading factor comparison determination; however, the downlink traffic channel power budget (1120, 1128) changes in response to different results from the loading factor comparison tracking.

Drawing 1100 also includes exemplary drawing 1106 which includes base station 1 1150 and base station 2 1152 coupled together via network link 1170. Base station 1 1150 is coupled to a plurality of wireless terminals (WT 1 1154, WT 2 1156, WT 3 1158, WT 4 1160) via wireless links. Base station 2 1152, at this time, is coupled to a plurality of wireless terminals (WT 1' 1162, WT 4' 1168) via wireless links. BS 1 1150 has calculated a loading factor 1172 corresponding to its current downlink traffic channel loading. BS 2 1152 has calculated a loading factor ($LF_{BS2}$ (t3)) 1188 corresponding to its current downlink traffic channel loading. BS 2 sends message 1190 via backhaul network link 1170 conveying its loading factor 1188. BS 1 1150 receives the loading factor message 1190 recovers the loading factor corresponding to BS 2 1188 and compares loading factor 1188 to a previously stored loading factor corresponding to BS 2 ($L_{BS\ 2}$ (t2)) 1184. BS 1 determines that the current loading factor for BS 2 1188 is less than the previous loading factor for BS 2 1184 and therefore increases its downlink transmission power budget to level 1130. Drawing 1112 of drawing 1100 illustrates the downlink power budget for BS 1 corresponding to the drawing 1106 example. In drawing 1112, the height of arrow 1130 indicates the BS 1 adjusted downlink power budget for the determined condition that the current loading factor of base station 2 is less than the previous loading factor of base station 2. Downlink power budget 1130 can be partitioned into a $1^{st}$ portion 1132 associated with the downlink pilot channel, a second portion associated with downlink traffic channels 1136, and a third portion associated with other downlink channels 1134. In this example, it should be observed that the power level associated with the pilot channel 1124, 1132 is the same irrespective of the loading factor comparison determination; however, the downlink traffic channel power budget (1128, 1136) changes in response to different results from the loading factor comparison tracking.

FIG. 9 is a drawing 1200 used to illustrate features of various embodiments in which a base station in a wireless communication system including a plurality of base stations receives loading factor information corresponding to another base station and determines a downlink transmission power budget as a function of base station loading factor information. Drawing 1200 includes exemplary drawing 1202 which includes base station 1 1250 and base station 2 1252 coupled together via network link 1270. Base station 1 1250 is coupled to a plurality of wireless terminals (WT 1 1254, WT 2 1256, WT 3 1258, WT 4 1260) via wireless links. Base station 2 1252 is coupled to a plurality of wireless terminals (WT 1' 1262, WT 2' 1264, WT 3' 1266, WT 4' 1268) via wireless links. BS 1 1250 has calculated a loading factor ($L_{BS\ 1}$ (t1)) 1272 corresponding to its current downlink traffic channel loading. BS 2 1252 has calculated a loading factor 1274 corresponding to its current downlink traffic channel loading. BS 2 sends message 1276 via backhaul network link 1270 conveying its loading factor ($LF_{BS2}$) 1274. BS 1 1250 receives the loading factor message 1276 recovers the loading factor corresponding to BS 2 1274 and compares loading factor 1274 to its own loading factor 1272. In this example, BS 1 determines that the loading factor for BS 2 1274 is the same as its own loading factor 1272, and for purposes of illustration we will assume that both base station have been stable at these levels, and therefore base station 1 does not readjust its power budget which is set at level 1214. Drawing 1208 of drawing 1200 illustrates the downlink power budget for BS 1 corresponding to the drawing 1202 example. In drawing 1208, the height of arrow 1214 indicates the BS 1 downlink power budget. Downlink power budget 1214 can be partitioned into a $1^{st}$ portion 1216 associated with the downlink pilot channel, a second portion associated with downlink traffic channels 1220, and a third portion associated with other downlink channels 1218.

Drawing 1200 also includes exemplary drawing 1204 which includes base station 1 1250 and base station 2 1252 coupled together via network link 1270. Base station 1 1250 is, at this time, coupled to a plurality of wireless terminals (WT 1 1254, WT 2 1256, WT 3 1258, WT 4 1260, WT 5 1278, WT 6 1280, WT 7 1282) via wireless links. Base station 2 1252, at this time, is coupled to a plurality of wireless terminals (WT 1' 1262, WT 2' 1264, WT 3' 1266, WT 4' 1268) via wireless links. BS 1 1250 has calculated a loading factor ($L_{BS\ 1}$(t2)) 1272 corresponding to its current downlink traffic channel loading. BS 2 1252 has calculated a loading factor ($LF_{BS2}$) 1274 corresponding to its current down link traffic channel loading. BS 2 sends message 1276 via backhaul network link 1270 conveying its loading factor 1274. BS 1 1250 receives the loading factor message 1276 recovers the loading factor corresponding to BS 2 1274 and recognizes the loading factor corresponding to BS 2 has remained unchanged. BS 1 1250 compares its current loading factor 1284 to a previously stored loading factor corresponding to BS 1 ($LF_{BS\ 1}(t1)$) 1272. BS 1 determines that the current loading factor for BS 1 1284 is greater than the previous loading factor for BS 1 1272 and therefore increases its downlink transmission power budget to level 1222. Drawing 1210 of drawing 1200 illustrates the downlink power budget for BS 1 corresponding to the drawing 1204 example. In drawing 1210, the height of arrow 1222 indicates the BS 1 adjusted downlink power budget for the determined condition that the current loading factor of base station 1 is greater than the previous loading factor of base station 1. Downlink power budget 1222 can be partitioned into a $1^{st}$ portion 1224 associated with the downlink pilot channel 1224, a second portion associated with downlink traffic channels 1228, and a third portion associated with other downlink channels 1226. In this example, it should be observed that the power level associated with the pilot channel 1216, 1224 is the same irrespective of the loading factor comparison determination; however, the downlink traffic channel power budget (1220, 1228) changes in response to different results from the loading factor comparison.

Drawing 1200 also includes exemplary drawing 1206 which includes base station 1 1250 and base station 2 1252 coupled together via network link 1270. Base station 1 1250, at this time, is coupled to a plurality of wireless terminals (WT 3 1258, WT 4 1260) via wireless links. Base station 2 1252, at this time, is coupled to a plurality of wireless terminals (WT 1' 1262, WT 2' 1264, WT 3' 1266, WT 4' 1268) via wireless lurks. BS 1 1250 has calculated a loading factor ($LF_{BS\ 1}(t3)$) 1286 corresponding to its current downlink traffic channel loading. BS 2 1252 has calculated a loading factor ($LF_{BS2}$) 1274 corresponding to its current downlink traffic channel loading. BS 2 sends message 1276 via backhaul network link 1270 conveying its loading factor 1274. BS 1 1250 receives the loading factor message 1276 recovers the loading factor corresponding to BS 2 1274 and recognizes the loading factor corresponding to BS 2 has remained unchanged. BS 1 compares its current loading factor 1286 to a previously stored loading factor corresponding to BS 1 ($LF_{BS\ 1}(t2)$) 1284. BS 1 determines that the current loading factor for BS 1 1286 is less than the previous loading factor for BS 1 1284 and therefore decreases its downlink transmission power budget to level 1230. Drawing 1212 of drawing 1200 illustrates the downlink power budget for BS 1 corresponding to the drawing 1206 example. In drawing 1212, the height of arrow 1230 indicates the BS 1 adjusted downlink power budget for the determined condition that the current loading factor of base station 1 is less than the previous loading factor of base station 1. Downlink power budget 1230 can be partitioned into a $1^{st}$ portion 1232 associated with the downlink pilot channel, a second portion associated with downlink traffic channels 1236, and a third portion associated with other downlink channels 1234. In this example, it should be observed that the power level associated with the pilot channel 1224, 1232 is the same irrespective of the loading factor comparison determination; however, the downlink traffic channel power budget (1228, 1236) changes in response to different results from the loading factor comparison.

Figure 10A:
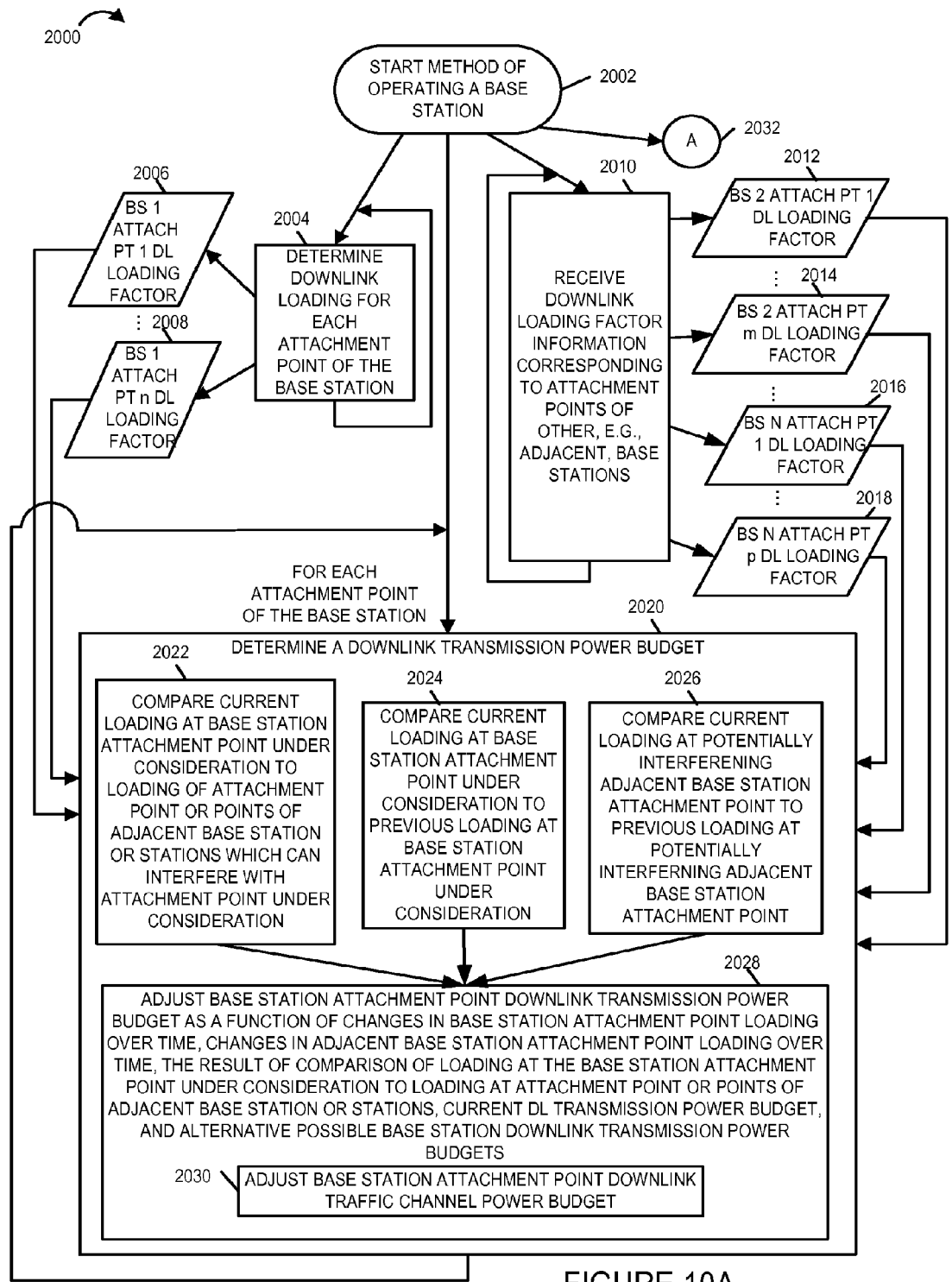
FIG. 10 comprising the combination of FIG. 10A
FIG. 10B is a drawing of a flowchart of an exemplary method of operating a base station in accordance with various embodiments.
Figures 10, 10A, 10B:
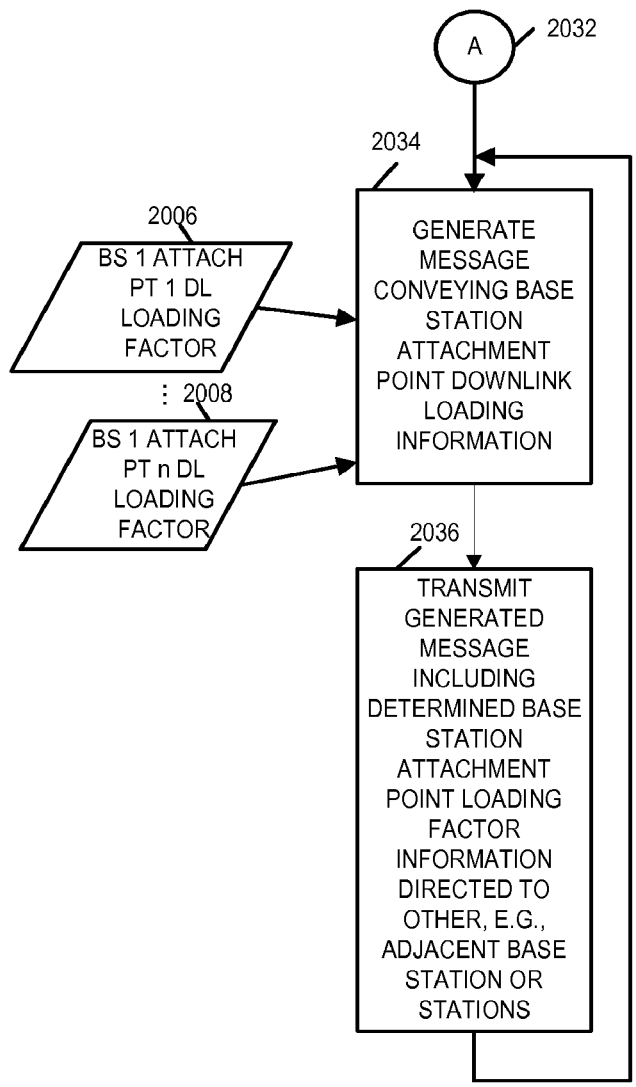

FIG. 10 comprising the combination of FIG. 10A and FIG. 10B is a drawing of a flowchart 2000 of an exemplary method of operating a base station in accordance with various embodiments. The exemplary base station, e.g., base station 200 of FIG. 2, may be a base station in a multiple access wireless communications system including a plurality of base stations, each base station including at least one base station attachment point. Operation starts in step 2002 where the base station is powered on and initialized. Operation proceeds from start step 2002 to step 2004, step 2010, step 2020, and step 2034 via connecting node A 2032.

In step 2004, which is performed on a recurring basis, the base station determines downlink loading for each base station attachment point. Outputs of step 2004 are base station 1 downlink loading factor 2006, . . . base station 1 attachment point n downlink loading factor 2008. Information (2006, . . . , 2008) is an input to step 2020 and step 2034.

In step 2010 the base station receives downlink loading factor information corresponding to attachment points of other, e.g., adjacent, base station. The reception may be via an interface to the backhaul network and/or via a wireless receiver, e.g., with a wireless terminal concurrently connected to the base station and to another base station acting as a relay. The reception may be performed on a recurring basis, in response to a request, and/or or in response to a decision by another base station to communicate its downlink loading information. Information corresponding to various attachment points of one of more base stations is an output of step 2010 (base station 2 attachment point 1 downlink loading factor 2012, . . . , base station 2 attachment point m downlink loading factor 2014, . . . , base station N attachment point 1 downlink loading factor 2016, . . . , base station N attachment point p downlink loading factor 2018). Information (2012, 2014, 2016, 2018) are inputs to step 2020.

Step 2020 is performed, on an ongoing basis, for each attachment point of the base station. In step 2020, the base station determines a downlink transmission power budget as a function of loading factor information corresponding to other, e.g., adjacent, base station or stations. In some embodiments, a determined downlink transmission power budget is a power budget for a set of downlink communications channels including at least a pilot channel and a data channel, and the pilot channel transmission power level e.g., pilot channel per tone power, is independent of loading information while the portion of the determined downlink power budget corresponding to the traffic channel is dependent upon loading information of the base station attachment point to which the budget corresponds and loading of an adjacent point or points of adjacent base station or stations. Step 2020 includes sub-steps 2022, 2024, 2026, and 2028. In sub-step 2022, the base station compares current loading at the base station attachment point wider consideration to loading of an attachment point or points of adjacent base station or stations which can interfere with the attachment point wider consideration. In sub-step 2024, the base station compares current loading at the base station attachment point under consideration to previous loading at the base station attachment point under consideration. In sub-step 2026, the base station compares current loading at potentially interfering adjacent base station attachment point to previous loading at the same potentially interfering adjacent base station attachment point. Sub-step 2026 may be performed for a plurality of different potentially interfering adjacent base station attachment points.

Operation proceeds from sub-steps 2022, 2024, and 2026 to sub-step 2028. In sub-step 2028, the base station adjusts base station attachment point downlink transmission power budget as a function of changes in base station attachments point loading over time, changes in adjacent base station attachment point loading over time, the result of comparison of loading at the base station attachment point under consideration to loading at attachment point or points of adjacent base stations, current downlink transmission power budget, previous downlink transmission power budget, and alternative possible downlink transmission power budgets. Sub-step 2028 includes sub-step 2030. In sub-step 2030, the base station adjusts the base station attachment point downlink traffic channel power budget.

In some embodiments, determining a power budget for a base station attachment point includes determining the power budget to correspond to a first value indicative of said budget when a comparison indicates that loading of an attachment point of an other, e.g., adjacent, base station is greater than loading of the base station attachment point to which the budget applies; and determining the power budget to correspond to a second value indicative of a power budget greater than the power budget indicated by the first value when the comparison indicates that the loading of an attachment point of an other, e.g., adjacent, base station is less than the loading of the base station attachment point to which the budget applies.

In various embodiments, determining a power budget for a base station attachment point includes decreasing a current power budget in response to detecting an increase in loading at an attachment point of other, e.g., adjacent, base station. In some embodiments, determining a power budget for a base station attachment point includes increasing a current power budget in response to detecting a decrease in loading at an attachment point of an other, e.g., adjacent, base station.

In various embodiments, determining a power budget for a base station attachment point includes increasing a current power budget in response to detecting an increase in loading at the attachment point. In some embodiments, determining a power budget for a base station attachment point includes decreasing a current power budget in response to detecting a decrease in loading at the attachment point.

In some embodiments, the base station supports, for an attachment point, a plurality, e.g., two, three, or more than three, of predetermined downlink transmission power budget alternative levels and the base station selects to use one of the possible alternative levels for a given time for the attachment point. Thus a base station may dynamically vary its power budget between the possible alternatives in response to loading changes including loading changes at adjacent base stations. In some embodiments, base stations may communicate information to other base stations, e.g., adjacent base stations, identifying their selected downlink transmission power budget level.

In step 2034, the base station generates a message conveying base station attachment point downlink loading information. Base station attachment point loading information (BS 1 attachment point 1 downlink loading factor 2006, . . . , base station 1 attachment point n downlink loading factor 2008) are inputs to step 2034. Operation proceeds from step 2034 to step 2036. In step 2036, the base station transmits the generated message of step 2034 including determined base station attachment point loading factor information directed to other e.g., adjacent, base station or stations. The transmission directed to the adjacent base station may be via an interface to a backhaul network and/or via a wireless terminal coupled to both the base station and the adjacent base stations. The operations of steps 2034 and 2036 are performed on an ongoing basis, e.g., as part of recurring timing structure, in response to a request from an adjacent base station and/or based on a decision by the base station to communicates its loading information to one or more adjacent base stations. In some embodiments, the downlink loading factor of one of the base stations attachment points is communicated to one or more selected adjacent base stations in response to the base station determining that its loading has reached a high level and/or in response to a detected in change in loading, e.g., of a predetermined amount.

While described in the context of an OFDM system, the methods and apparatus of various embodiments are applicable to a wide range of communications systems including many non-OFDM and/or non-cellular systems.

In various embodiments nodes described herein are implemented using one or more modules to perform the steps corresponding to one or more methods, for example, signal processing, beacon generation, beacon detection, beacon measuring, connection comparisons, connection implementations. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first base station in a multiple access wireless communications system including a plurality of base stations, each of said plurality of base stations including at least one base station attachment point, the method comprising:
   receiving second base station loading factor information indicative of loading of a second base station attachment point corresponding to a second base station; and
   determining a downlink transmission power budget as a function of said received second base station loading factor information.

2. The method of claim 1, wherein determining a downlink transmission power budget is further performed as a function of additional loading factor information corresponding to another base station attachment point.

3. The method of claim 2, wherein said another base station attachment point corresponds to said first base station, and
   wherein said determining a downlink transmission power budget includes comparing said additional loading factor information to said second base station loading factor information.

4. The method of claim 2, wherein said determined downlink transmission power budget is a power budget for a set of downlink communications channels including at least a pilot channel and a data traffic channel; and wherein a portion of said determined downlink transmission power budget for the pilot channel is independent of said additional and second loading factor information and wherein a portion of the determined downlink transmission power budget corresponding to said data traffic channel depends on the second base loading factor information and said additional loading factor information.

5. The method of claim 3, wherein determining said power budget includes:

determining said power budget to correspond to a first value indicative of said budget when said comparing indicates said second base station loading is greater than said first base station loading; and determining said power budge to correspond to a second value indicative of a power budget greater than the power budget indicated by said first value when said comparing indicates said second base station loading is less than said first base station loading.

6. The method of claim 2, wherein determining said power budget includes:

decreasing a current power budget in response to detecting an increase in loading at said second base station.

7. The method of claim 2, wherein determining said power budget includes:

increasing a current power budget in response to detecting an decrease in loading at said second base station.

8. The method of claim 2, wherein determining said power budget includes:

increasing a current power budget in response to detecting an increase in loading at said first base station.

9. The method of claim 2, wherein determining said power budget includes:

decreasing a current power budget in response to detecting an decrease in loading at said first base station.

10. A base station comprising:

means For receiving base station loading factor information indicative of loading of a base station attachment point corresponding to another base station; and means for determining a downlink transmission power budget, wherein said means for determining a downlink transmission power budget determines the downlink transmission power budget as a function of said received base station loading factor information.

11. The base station of claim 10, wherein said means for determining a downlink transmission power budget determines said downlink transmission power budget as a function of additional loading factor information corresponding to an additional base station attachment point.

12. The base station of claim 11, wherein said additional base station attachment point corresponds to said base station, and wherein said means for determining a downlink transmission power budget includes means for comparing said additional loading factor information to said other base station loading factor information.

13. The base station of claim 11, wherein said determined downlink transmission power budget is a power budget for a set of downlink communications channels including at least a pilot channel and a data traffic channel; and wherein a portion of said determined power budget for the pilot channel is independent of said other and additional loading factor information and wherein a portion of the determined downlink transmission power budget corresponding to said data traffic channel depends on the other base loading factor information and said additional loading factor information.

14. The base station of claim 12, wherein said means for determining a downlink transmission power budget determines said downlink transmission power budget to correspond to a first value indicative of said budget when said comparing indicates said other base station loading is greater than said base station loading; and determines said downlink transmission power budge to correspond to a second value indicative of a power budget greater than the power budget indicated by said first value when said comparing indicates said other base station loading is less than said base station loading.

15. The base station of claim 11, wherein said means for determining a downlink transmission power budget decreases a current power budget in response to detecting an increase in loading at said other base station.

16. The base station of claim 11, wherein said means for determining a downlink transmission power budget increases a current power budget in response to detecting a decrease in loading at said second base station.

17. The base station of claim 1 wherein said means for determining a downlink transmission power budget includes means for tracking loading changes at said base station, and wherein said means for determining downlink transmission power budget increases a current power budget in response to detecting an increase in loading at said base station.

18. The base station of claim 11, wherein said means for determining a downlink transmission power budget includes means for tracking loading changes at said base station, and wherein said means for determining for a downlink transmission power budget decreases a current power budget in response to detecting an decrease in loading at said base station.

19. A base station comprising:

an interface for receiving signals communicating base station loading factor information indicative of loading of at least one base station attachment point corresponding to at least one other base station;

a loading factor information recovery module for recovering loading factor information corresponding to at least one other base station from said received signals;

a downlink transmission power budget determination module, wherein said downlink transmission power budget determination module determines a downlink transmission power budget for an attachment point of the base station as a function said recovered loading factor information corresponding to at least one other base station.

20. The base station of claim 19, further comprising:

a loading factor determination module for determining a loading factor corresponding to an attachment point of the base station;

a loading factor comparison module for comparing the determined loading factor corresponding to an attachment point of the base station to a recovered loading factor corresponding to an attachment point of another base station, and wherein said downlink transmission power budget determination module uses results of the loading factor comparison module in determining the downlink power budget.

21. The base station of claim 19, wherein said determined power budget is a power budget for a set of downlink communications channels including at least a pilot channel and a data traffic channel; and wherein a portion of said determined power budget for the pilot channel is independent of said other and additional loading factor information and wherein a portion of the power budget corresponding to said data traffic channel depends on the other base loading factor information and said additional loading factor information.

22. The base station of claim 21, wherein said downlink transmission power budget determination module determines said power budget to correspond to a first value indicative of said budget when said loading factor comparison module determines said other base station loading is greater than said base station loading; and determines said power budget to correspond to a second value indicative of a power budget greater than the power budget indicated by said first value when said loading factor comparison module indicates said other base station loading is less than said base station loading.

23. The base station of claim 21, further comprising:
a loading factor tracking module for tracking changes in loading factors at base station attachment points, and wherein said downlink transmission power budget determination module decreases a current power budget in response to detecting an increase in loading at one of said other base stations.

24. The base station of claim 21, further comprising:
a loading factor tracking module for tracking changes in loading factors at base station attachment points, and wherein said downlink transmission power budget determination module increases a current power budget in response to detecting a decrease in loading at one of said other base stations.

25. The base station of claim 21, further comprising:
a loading factor tracking module for tracking changes in loading factors at base station attachment points and, wherein said downlink transmission power budget determination module increases current power budget in response to detecting an increase in loading at an attachment point of said base station.

26. The base station of claim 21, further comprising:
a loading factor tracking module for tracking changes in loading factors at base station attachment points, and wherein said downlink transmission power budget determination module decreases a current power budget in response to detecting a decrease in loading at an attachment point of said base station.

27. A non-transitory computer readable medium embodying machine executable instructions for controlling a first base station in a multiple access wireless communications system including a plurality of base stations to implement a method, the non-transitory computer readable medium comprising:
machine executable instructions to control said first base station to receive second base station loading factor information indicative of loading of a second base station attachment point corresponding to a second base station; and
machine executable instructions to control said first base station to determine a downlink transmission power budget as a function of said received second base station loading factor information.

28. The non-transitory computer readable medium of claim 27, further embodying machine executable instructions for controlling the first base station to determine the downlink transmission power budget as a function of additional loading factor information corresponding to another base station attachment point.

29. The non-transitory computer readable medium of claim 28, wherein said another base station attachment point corresponds to said first base station.

30. The non-transitory computer readable medium of claim 29, further embodying machine executable instructions for controlling the first base station to compare additional loading factor information to said second base station loading factor information as part of determining the downlink transmission power budget.

31. The non-transitory computer readable medium of claim 30, wherein said downlink transmission power budget is a power budget for a set of downlink communications channels including at least a pilot channel and a data traffic channel; and
wherein a portion of said downlink transmission power budget for the pilot channel is independent of said additional and second loading factor information and wherein a portion of the determined downlink transmission power budget corresponding to said data traffic channel depends on the second base loading factor information and said additional loading factor information.

32. A base station operable in a communication system, the base station comprising:
a processor configured to:
receive second base station loading factor information indicative of loading of a second base station attachment point corresponding to a second base station; and
determine a downlink transmission power budget as a function of said received second base station loading factor information.

33. The base station of claim 32, wherein the processor is further configured to:
determine the downlink transmission power budget as a function of additional loading factor information corresponding to another base station attachment point.

34. The base station of claim 33, wherein said another base station attachment point corresponds to said first base station, and
wherein the processor is further configured to determine the downlink transmission power budget by operations including comparing additional loading factor information to said second base station loading factor information.

35. The base station of claim 34, wherein said determined downlink transmission power budget is a power budget for a set of downlink communications channels including at least a pilot channel and a data traffic channel; and
wherein a portion of said determined downlink transmission power budget for the pilot channel is independent of said additional and second loading factor information and wherein a portion of the determined downlink transmission power budget corresponding to said data traffic channel depends on the second base loading factor information and said additional loading factor information.

* * * * *